United States Patent
Poulos et al.

(10) Patent No.: US 10,007,352 B2
(45) Date of Patent: Jun. 26, 2018

(54) HOLOGRAPHIC DISPLAY SYSTEM WITH UNDO FUNCTIONALITY

(71) Applicant: Microsoft Technology Licensing, LLC, Redmond, WA (US)

(72) Inventors: Adam Gabriel Poulos, Sammamish, WA (US); Johanna Dy Lynn, Seattle, WA (US); Michael Scavezze, Bellevue, WA (US); Daniel Joseph McCulloch, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/832,951

(22) Filed: Aug. 21, 2015

(65) Prior Publication Data

US 2017/0052595 A1    Feb. 23, 2017

(51) Int. Cl.
*G06F 3/01*    (2006.01)
*G06F 3/0484*    (2013.01)
*G02B 27/01*    (2006.01)

(52) U.S. Cl.
CPC ......... *G06F 3/017* (2013.01); *G02B 27/0103* (2013.01); *G06F 3/013* (2013.01); *G06F 3/04842* (2013.01); *G06F 3/04847* (2013.01)

(58) Field of Classification Search
CPC .......... G06F 3/011–3/013; G06F 3/017; G06F 3/0484–3/04855; G06F 2203/04802; G06F 2203/04803; G02B 27/01–27/0103; G02B 2027/0105–2027/0109; G06T 19/00–19/20; G06T 2200/04–2200/36; G06T 2219/004–2219/2024
See application file for complete search history.

(56) References Cited

U.S. PATENT DOCUMENTS

| | | |
|---|---|---|
| 6,185,591 B1 | 2/2001 | Baker et al. |
| 6,543,006 B1 | 4/2003 | Zundel et al. |
| 7,536,583 B2 | 5/2009 | Passerini et al. |
| 8,398,243 B2 | 3/2013 | Renaud-Goud |
| 8,493,366 B2 | 7/2013 | Bathiche et al. |

(Continued)

FOREIGN PATENT DOCUMENTS

WO        0036501 A1    6/2000

OTHER PUBLICATIONS

"International Search Report and Written Opinion Issued in PCT Application No. PCT/US2016/043798", dated Oct. 11, 2016, 14 Pages.

(Continued)

*Primary Examiner* — Nathan Danielsen
(74) *Attorney, Agent, or Firm* — Arent Fox LLP

(57) ABSTRACT

Disclosed are techniques for performing undo operations on holographic objects in an immersive 3D visual environment. A display system allows the user to undo a given user operation performed on a particular selected holographic object without affecting any other holographic objects, based on a user's gaze and/or other user input. The technique can be implemented in conjunction with a scrollable visual "timeline" in which multiple past states of the display environment are displayed to the user and are selectable by the user as the target state of the revert operation. Also disclosed is a technique for partially undoing a single continuous user action in a holographic display system.

21 Claims, 20 Drawing Sheets

(56) References Cited

U.S. PATENT DOCUMENTS

| | | | |
|---|---|---|---|
| 8,538,757 | B2 | 9/2013 | Patch |
| 8,542,209 | B2 | 9/2013 | Lim |
| 8,564,865 | B2 | 10/2013 | Klug et al. |
| 8,576,222 | B2 | 11/2013 | Handley et al. |
| 8,645,824 | B2 | 2/2014 | Baer |
| 8,832,551 | B2 | 9/2014 | Muser |
| 2009/0293014 | A1* | 11/2009 | Meuninck .......... G06F 3/04817 715/810 |
| 2010/0050188 | A1 | 2/2010 | Schellingerhout et al. |
| 2010/0164990 | A1 | 7/2010 | Van Doorn |
| 2011/0107246 | A1 | 5/2011 | Vik |
| 2011/0252301 | A1 | 10/2011 | Vollmer et al. |
| 2012/0254752 | A1 | 10/2012 | Svendsen et al. |
| 2013/0050260 | A1* | 2/2013 | Reitan .................. G06F 3/011 345/633 |
| 2013/0050432 | A1 | 2/2013 | Perez et al. |
| 2013/0120439 | A1 | 5/2013 | Harris et al. |
| 2014/0164331 | A1 | 6/2014 | Li et al. |
| 2014/0282008 | A1 | 9/2014 | Verard et al. |
| 2014/0333666 | A1 | 11/2014 | Poulos et al. |
| 2015/0033263 | A1* | 1/2015 | Hiyoshi .............. G06F 3/04842 725/44 |
| 2015/0039566 | A1 | 2/2015 | Baumann et al. |
| 2015/0128048 | A1 | 5/2015 | Moffatt et al. |
| 2015/0154679 | A1 | 6/2015 | Fonte et al. |
| 2015/0363085 | A1* | 12/2015 | Spjuth .................. G06F 3/0482 715/768 |

OTHER PUBLICATIONS

Zhou, et al., "Object-Based Nonlinear Undo Model", In Proceedings of IEEE the Twenty-First Annual International Computer Software and Applications Conference, Aug. 13, 1997, pp. 50-55.
"TaskInsight 3.3 update features speech commands for task lists and timelines—Released by Imaja for Mac OS X", Published on: Jun. 5, 2014, Available at: http://imaja.com/press/TaskInsight33PressRelease.html.
Matulic, et al., "Pen and Touch Gestural Environment for Document Editing on Interactive Tabletops", In Proceedings of ACM International Conference on Interactive Tabletops and Surfaces, Oct. 6, 2013, pp. 41-50.
Tolmasky, Francisco, "Add Undo and Redo to Your Web Application with Cappuccino", Published on: Nov. 13, 2008 Available at: http://blog.teamtreehouse.com/add-undo-and-redo-to-your-web-application-with-cappuccino.
"K-3D", Published on: Feb. 6, 2013, Available at: http://www.k-3d.org/node/1.
"Interactive Selective Undo", Retrieved on: May 26, 2015 Available at: https://github.com/yyoon/azurite-eclipse/wiki/Interactive-Selective-Undo.
"Vim Documentation: Undo", Published on: Apr. 14, 2014, Available at: http://vimdoc.sourceforge.net/htmldoc/undo.html.
Riofrio, Melissa, "Microsoft Leaps into 3D Computing with Windows Holographic and HoloLens", Published on: Jan. 21, 2015 Available at: http://www.pcworld.com/article/2872707/microsoft-leaps-into-3d-computing-with-windows-holographic-and-hololens.html.
Rafael, "MS Hololens, First Impressions", Published on: Mar. 2015 Available at: http://impactitgroup.com/ms-hololens-first-impressions/.
Seifried, et al., "Regional Undo/Redo Techniques for Large Interactive Surfaces", In Proceedings of the SIGCHI Conference on Human Factors in Computing Systems, May 5, 2012, pp. 2855-2864.
Araujo, et al., "Special Section on touching the 3rd Dimension: Mockup Builder: 3D Modeling on and above the Surface", In Journal of Computers & Graphics, vol. 37, May 2013, pp. 165-178.
Hughes, et al., "CaveCAD: Architectural Design in the CAVE", In IEEE Symposium on 3D User Interfaces, Mar. 16, 2013, 2 pages.
"OpenSpace3D 1.8.5", Published on: Mar. 15, 2015 Available at: http://www.openspace3d.com/lang/en/newsactualites/.
"On the Road for VR: Microsoft HoloLens at Build 2015, San Francisco", Published on: May 1, 2015 Available at: http://doc-ok.org/?p=1223.
Piumsomboon, et al., "User-Defined Gestures for Augmented Reality", In Proceedings of Extended Abstracts on Human Factors in Computing Systems, Apr. 27, 2013, 18 pages.
"Designing Apps for Google Glass Has Never Been Easier", Published on: Oct. 7, 2014 Available at: https://glasswireframe.wordpress.com/tag/google-glass-apps/.
Oe, et al., "Undo/Redo by Trajectory", In 15th International Conference on Human-Computer Interaction, Jul. 21, 2013, 6 pages.
Tom, et al., "3D Slicing Proof of Concept", Published on: Feb. 1, 2014 Available at: Http://blogs.cornell.edu/03/.
"International Preliminary Report on Patentability Issued in PCT Application No. PCT/US2016/043798", dated Nov. 9, 2017, 10 Pages.

* cited by examiner

HOLOGRAPHIC DISPLAY SYSTEM WITH UNDO FUNCTIONALITY

BACKGROUND

Virtual reality (VR) and augmented reality (AR) visualization systems are starting to enter the mainstream consumer electronics marketplace. AR Head Mounted Display (HMD) devices ("AR-HMD devices") are one promising application of such technology. These devices may include transparent display elements that enable a user to see concurrently both the real world around them and virtual content that is generated and displayed by the device. Virtual content that appears to be superimposed over the user's real-world view is commonly referred to as AR content. Displayed AR objects are often referred to as "holographic" objects. VR and AR visualization systems can provide users with entertaining, immersive virtual environments in which they can visually (and sometimes audibly) experience things they might not normally experience in real life.

SUMMARY

Introduced here is a method that comprises displaying, by a display system to a user, an immersive three-dimensional (3D) visual environment that includes a plurality of virtual 3D objects. The method further includes detecting a gaze direction of the user, and identifying a particular virtual 3D object of the plurality of virtual 3D objects as an intended target object of a revert operation for reverting object state, based on the gaze direction of the user. The method further includes, in response to a user input, reverting the state of the intended target object to a past state without altering the state of any other object of the plurality of virtual 3D objects.

Additionally, introduced here is a method that includes displaying, by a display system to a user, an immersive 3D visual environment that includes a plurality of virtual 3D objects. The method further includes modifying, by the display system, the state of at least one of the plurality of virtual 3D objects according to a single user action that continuously spans a time period from a first time point to a second time point, where the time period including a plurality of additional time points ascertainable by the display system. The method further includes identifying, by the display system, a particular virtual 3D object of the plurality of virtual 3D objects as an intended target object of a revert operation for reverting object state, and in response to a user input, partially reversing the single user action to revert the state of the intended target object to correspond to a time point between the first and second time points.

Also introduced here is at least one system and apparatus capable of implementing these methods, including an AR-HMD. Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here are, among other things, techniques for performing revert operations, also called "undo" operations, on holographic objects in an immersive 3D visual environment. In particular, and as described further below, a display system such as an AR- or VR-enabled display system enables a user to interact with (create, edit, move, delete, etc.) various holographic objects, including 3D holographic objects. The system allows the user to undo a given user operation performed on a particular selected holographic object without affecting any other holographic objects. A holographic object can be selected as the target of the undo operation based on, for example, the user's gaze, e.g., by use of eye-tracking technology. In certain embodiments, this technique can be implemented in conjunction with a scrollable visual "timeline" in which multiple past states of the display environment are displayed to the user as small summary images (e.g., thumbnail images) and are selectable by the user as the target state of the revert operation. Hence, this "single-object undo" capability provides more flexibility than conventional visualization systems that can only apply undo operations globally, i.e., to an entire display environment as a whole.

Also introduced here is a technique for partially undoing a single continuous user action in a holographic display system. For example, a single user action such as stretching or shrinking a holographic object or moving a holographic object along an arbitrary path through space can be partially reversed. Hence, the techniques introduced here further provide more flexibility than conventional visualization systems that can only apply undo operations to an entire user action, i.e., to undo or redo a given user action in its entirety.

These and other techniques are described further below. First, however, it is useful to describe an example of an environment and a device in which these techniques can be implemented.

Figure 1:
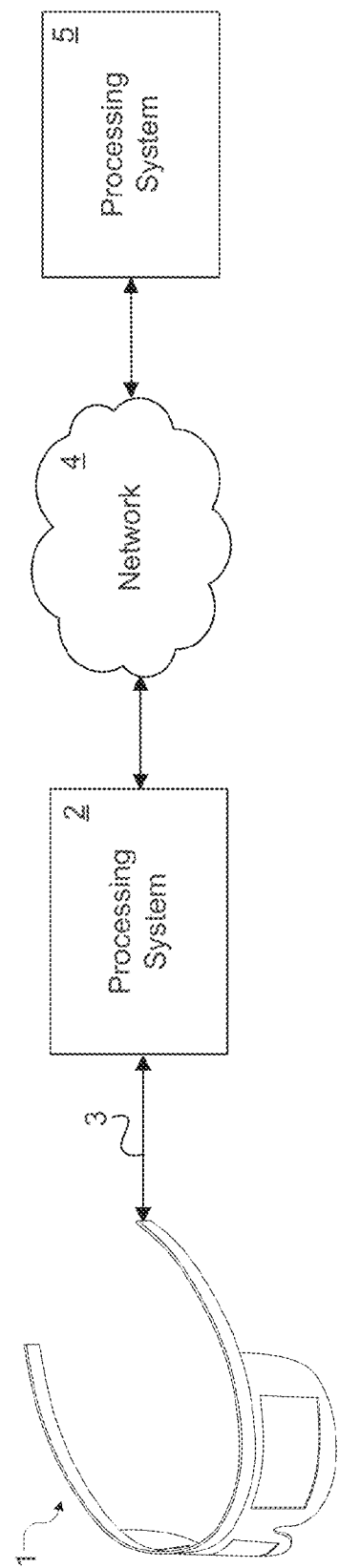
FIG. 1 illustrates an example of an environment including an AR-HMD device.

FIG. 1 shows an example of an environment including an AR-HMD device 1 that can implement the techniques introduced here. In the illustrated example, the AR-HMD device 1 is configured to communicate data to and from an external processing device 2 through a connection 3, which can be a wired connection, a wireless connection, or a combination thereof. In other use cases, however, the AR-HMD device 1 may operate as a standalone device. The connection 3 can be configured to carry any kind of data, such as image data (e.g., still images and/or full-motion video, including 2D and 3D images), audio data (including voice), multimedia, and/or any other type(s) of data. The processing system 2 may be, for example, a game console, personal computer, tablet computer, smartphone, or other type of processing device. The connection 3 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing system 2 may communicate with one or more other processing systems 5 via a network 4, which may be or include, for example, a local area network (LAN), a wide area network (WAN), an intranet, a metropolitan area network (MAN), the global Internet, or a combination thereof.

Figure 2:
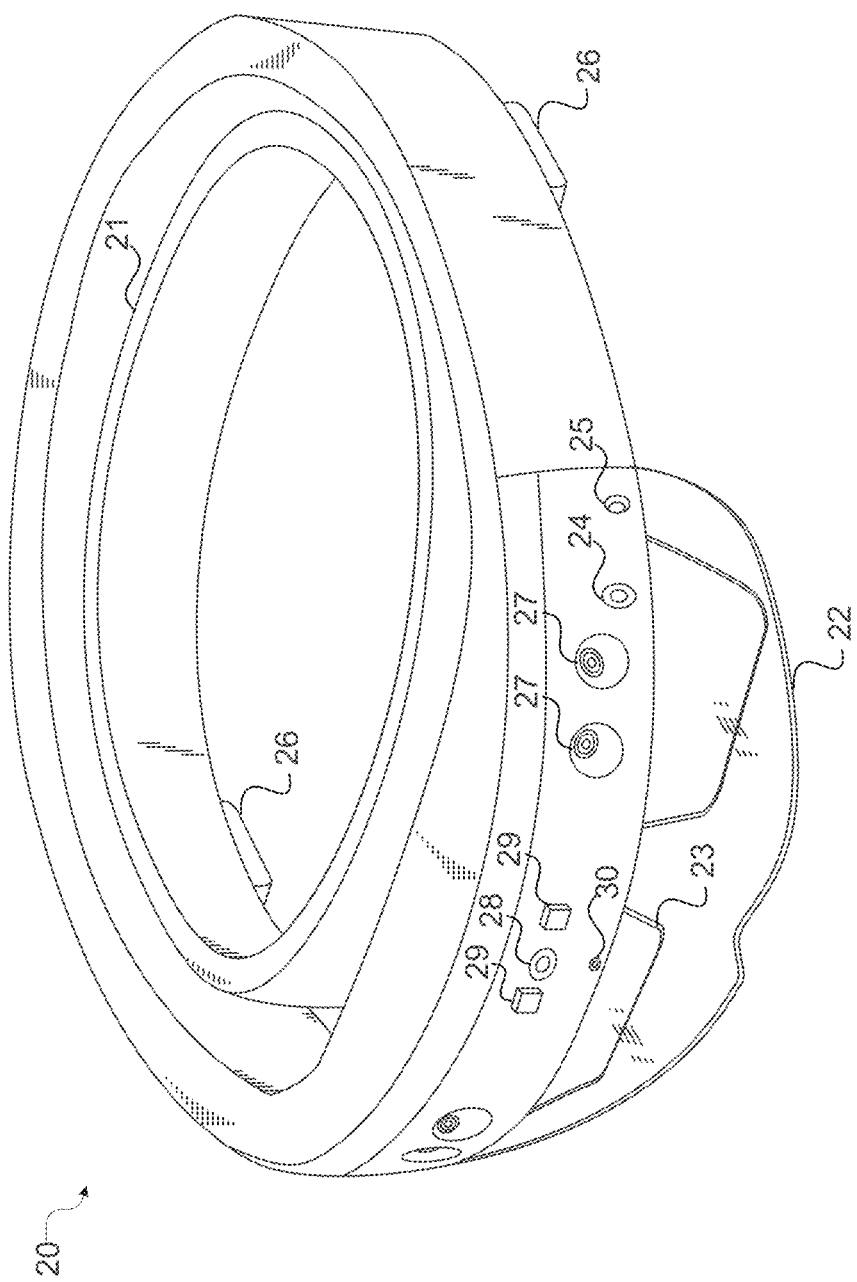
FIG. 2 shows a perspective view of an example of an AR-HMD device.

FIG. 2 shows a perspective view of an example of an AR-HMD device that can implement the techniques introduced here. The AR-HMD device 20 can be an embodiment of AR-HMD device 1 in FIG. 1. AR-HMD device 20 includes a head fitting, namely, a headband 21, by which the AR-HMD device 20 can be worn on the user's head. Attached to the headband 21 (directly or indirectly) is a transparent protective visor 22 that encloses one or more transparent AR display devices 23, each of which can overlay holographic images on the user's view of his real-world environment, for one or both eyes (e.g., by projecting light into the user's eyes). The protective visor 22 also encloses various circuitry (not shown) and sensors.

The AR-HMD device 20 further includes one or more eye-tracking cameras 24, one or more microphones 25 to input speech from the user (e.g., for use in recognizing voice commands and providing audio effects); one or more audio speakers 26 to output sound to the user; one or more visible-spectrum tracking cameras 27 for use in capturing images of surrounding surfaces to allow tracking of the user's head position and orientation in real-world space and hand gesture recognition; one or more infrared (IR) spectrum depth cameras 28 for use in determining distances to nearby surfaces (e.g., for use in surface reconstruction to model the user's environment); one or more IR illumination sources 29 for use with the depth camera(s) 28; and one or more visible spectrum video cameras 30 for use in capturing standard video of what the user sees. The AR-HMD device 20 also includes circuitry (not shown), which may be contained within the visor 22, to control at least some of the aforementioned elements and perform associated data processing functions (e.g., speech and gesture recognition and display generation). The circuitry may include, for example, one or more processors and one or more memories. Note that in other embodiments the aforementioned components may be located in different locations on the AR-HMD device 20. Additionally, some embodiments may omit some of the aforementioned components and/or may include additional components not mentioned above.

Figure 3:
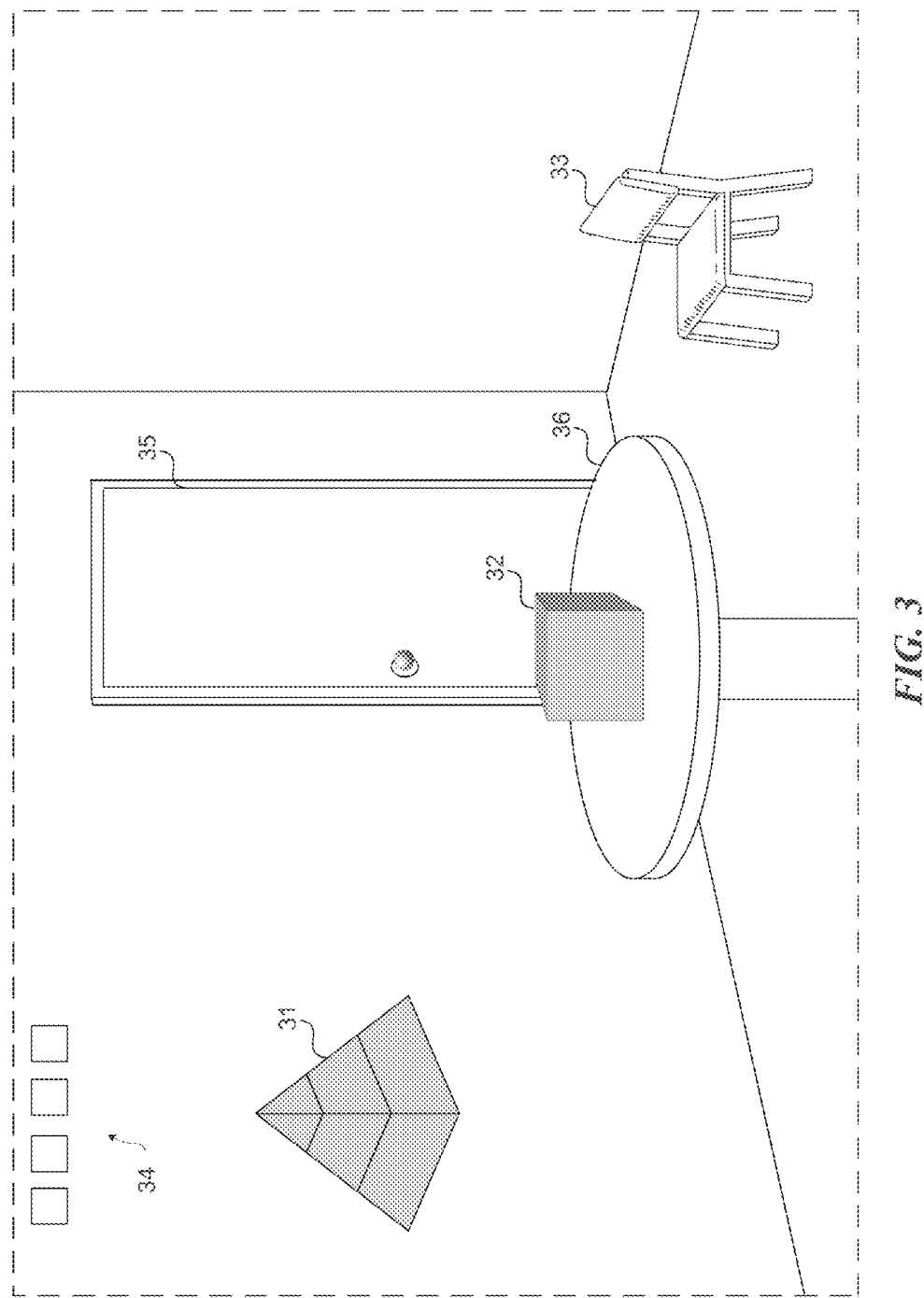
FIGS. 3 through 17 show examples of various views that a user might have through an AR- or VR-enabled display device in relation to using "undo" functions of the device.

FIGS. 3 through 17 show various examples of views that a user of an AR-HMD device might have in connection with the techniques introduced here (e.g., through display devices 23 and visor 22 in FIG. 2). In particular, FIG. 3 shows the central portion of the view that a user of the AR-HMD device might have while standing in a room while wearing an AR-HMD device, such as AR-HMD device 20. Through the display area of the device, the user may see various real-world objects, such as the floor and walls of the room, a chair 33, a table 36, and a door 35. The AR-HMD device may also display various holographic objects overlaid on the user's real-world view, such as a holographic pyramid 31 that appears to be floating in the air and/or a holographic cube 32 that appears to be resting on the surface of the table 36. These are very simple examples, to facilitate explanation; in practice a display system may enable the user to see and interact with much more complex holographic objects. Note that in some instances, the table 36 might be holographic rather than real (e.g., as a holographic work surface on which to build other holographic objects). The AR-HMD device may also display one or more holographic icons 34 and/or other user interface elements in the user's field of view, to enable the user to use various functions of the AR-HMD device.

While the AR-HMD device is operational, it can use its depth camera(s) to construct a 3D mesh model of all surfaces in the user's vicinity (e.g., within several meters), or at least of all nearby surfaces within the user's field of view, including their distances from the user (i.e., from the AR-HMD device). Techniques for generating a 3D mesh model of nearby surfaces by using depth detection (e.g., time of flight) are known in the art and need not be described herein. Accordingly, the 3D mesh model in the example of FIG. 3 would model at least all visible surfaces of the (physical) table and door as well as the room's walls, floor and ceiling, windows, and potentially even smaller features such as curtains, artwork (not shown) mounted on the walls, etc. The 3D mesh model can be stored in memory on the AR-HMD device. By use of the 3D mesh model and image data from the visual tracking system, circuitry in the AR-HMD device can at any time determine the user's precise position within the room. The 3D mesh model can be automatically updated on a frequent basis, such as several times per second.

By using the AR-HMD device, and through the use of hand gestures or movements, voice commands and/or controlled gaze, the user can create and manipulate various 3D holographic (AR) objects, such as pyramid 31 and cube 32. For example, the user can create and delete holographic objects, move and rotate holographic objects, change colors, fill patterns, surface textures and decorations of holographic objects, etc. As shown, these objects are overlaid on the user's view of the real world.

The user of an AR-HMD device or other immersive 3-D visualization system may perform various operations on holographic objects, and then subsequently determine that he wishes to undo one or more of those operations relative to a particular holographic object; and that object may not necessarily be the last object with which he interacted. In a conventional computer visualization system, the user would have to undo all operations that were performed after the desired previous state, including any desirable operations performed on other objects. The technique introduced here, however, enables the user to revert the state of a particular holographic object without affecting the state of any other holographic object. This technique is called "single-object undo" and is described further with reference to FIGS. 4 through 7.

Figure 4:
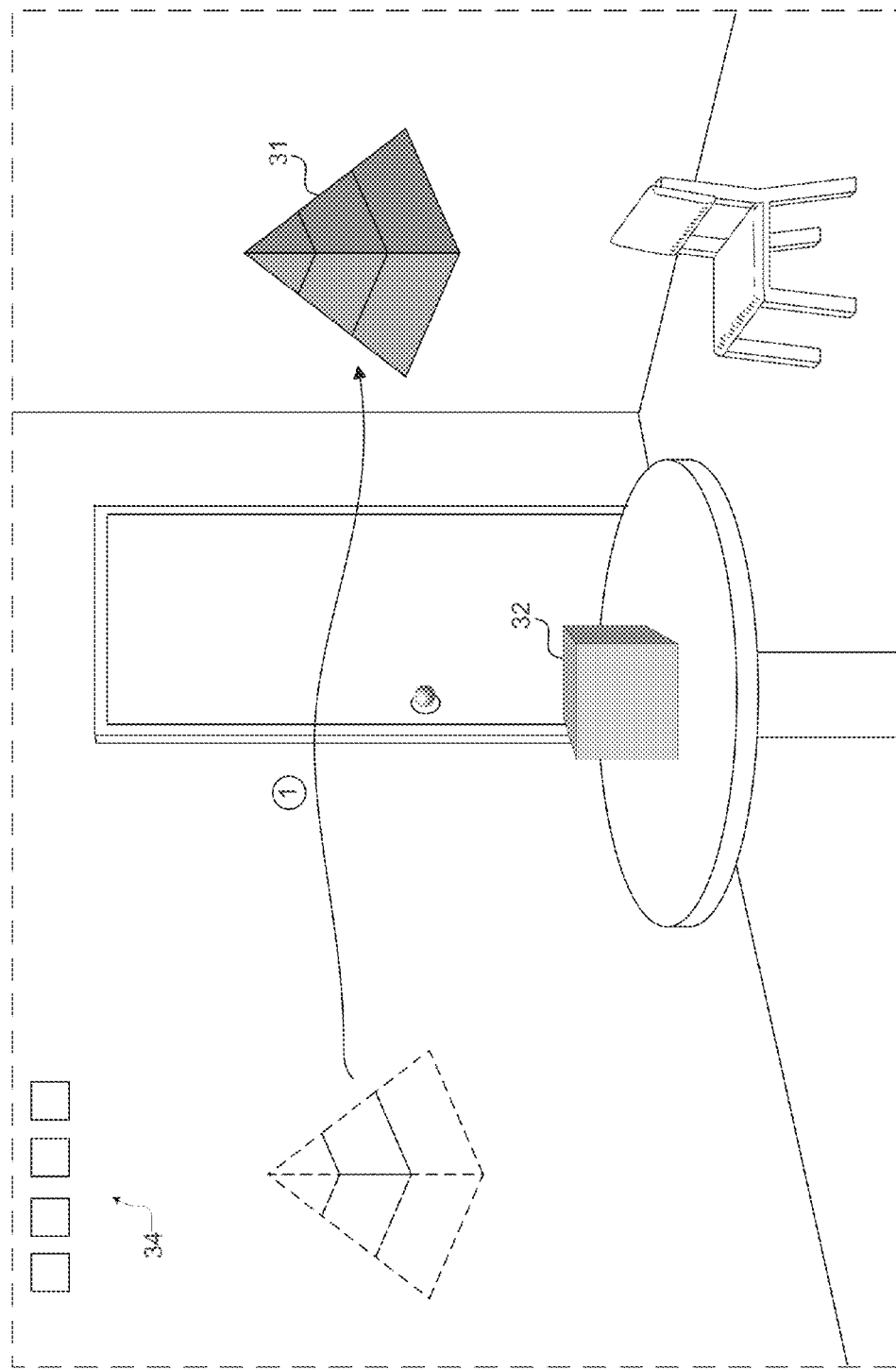
Figure 5:
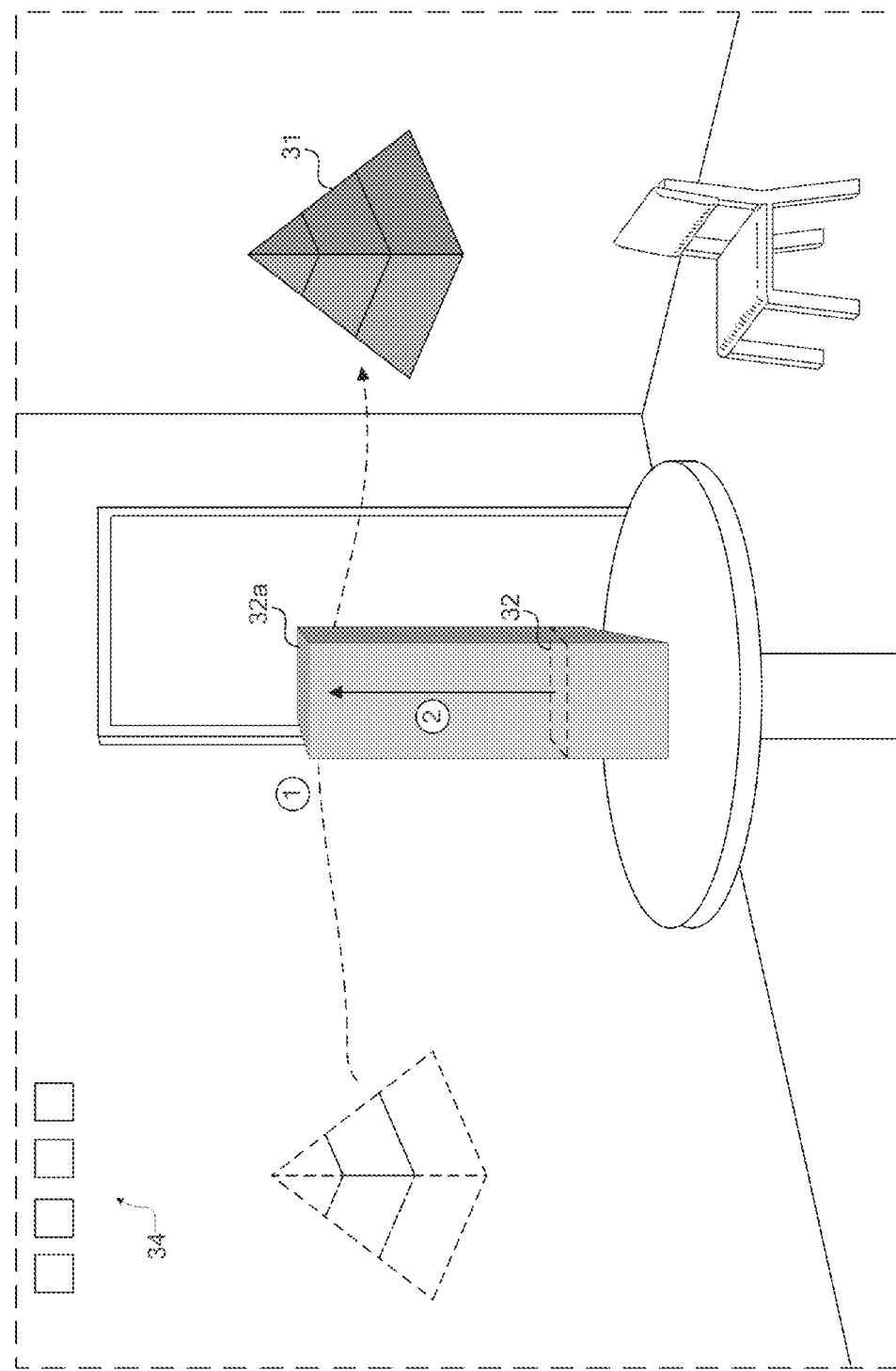

For purposes of explanation, assume that the user of an AR-HMD device wants to move pyramid 31 from left to right in the 3D space in front of the user. Accordingly, the user can use one or more hand movements and/or spoken commands to "grab" the pyramid 31 and "drag" it to the right, as shown in FIG. 4. The user may then decide to stretch the cube 32 vertically to transform it into a tall box 32a, as shown in FIG. 5, also by using hand movements and/or spoken commands, for example. Assume further that after performing these operations, the user changes his mind and decides that he does not want the pyramid 31 positioned on his right, i.e., that he wants the pyramid 31 back in its original location to the user's left; however, the user does not want to undo the stretching operation that was subsequently applied to change the cube 32 into box 32a. Accordingly, the user can select the pyramid 31 and undo the last operation performed on the pyramid 31 or any previous operation performed on it, without affecting any other objects.

Figure 6:
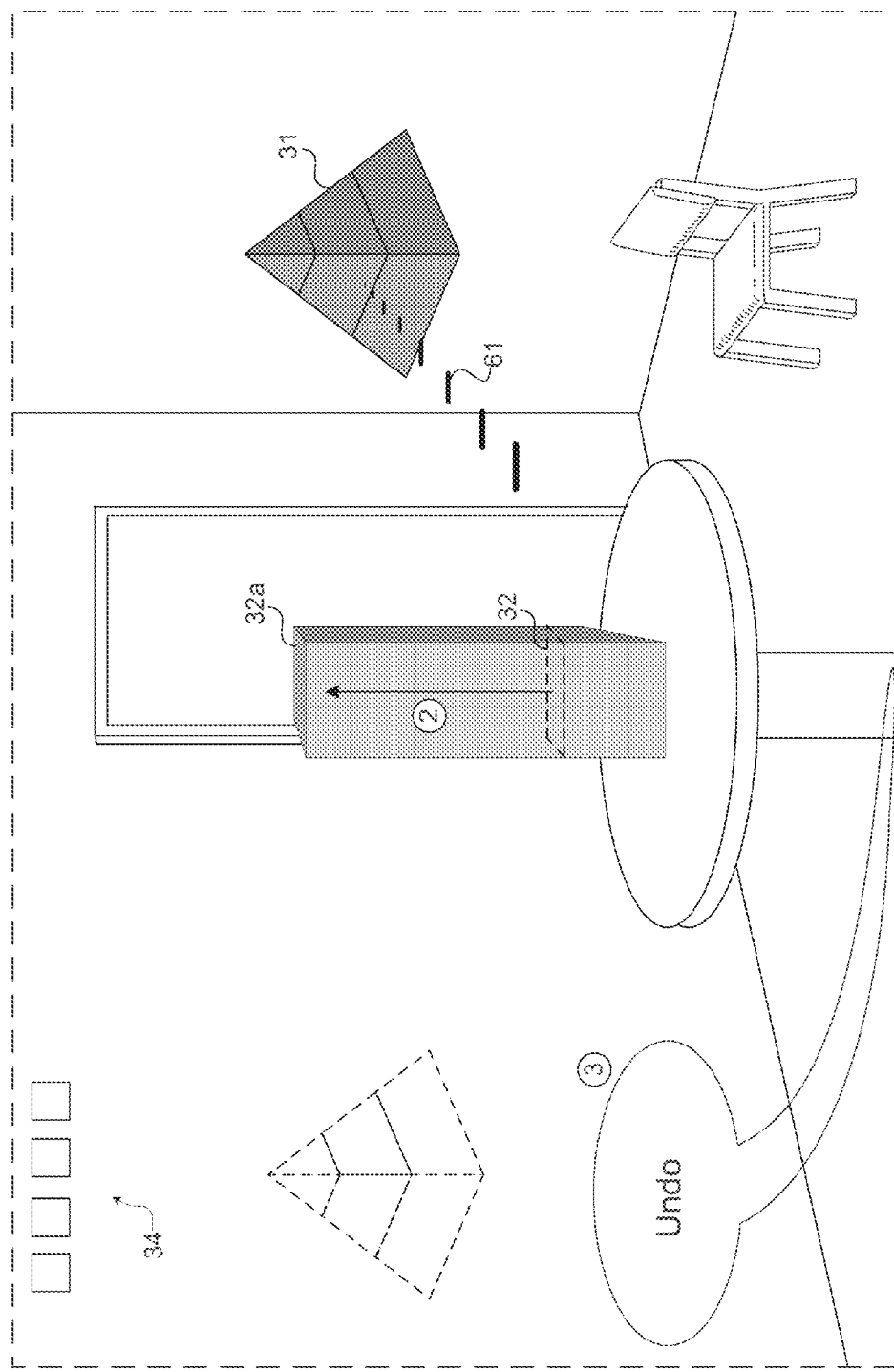
Figure 7:
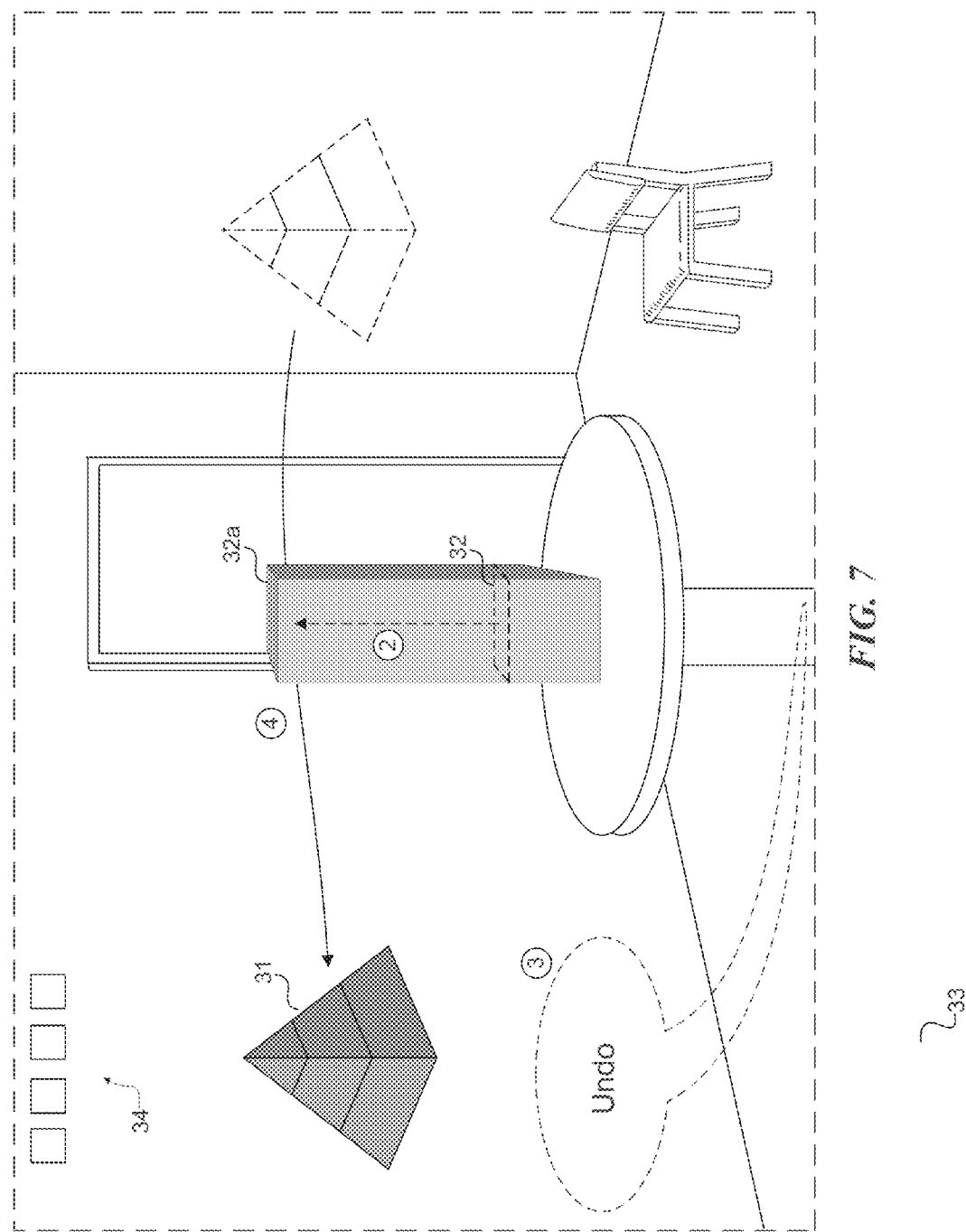

For example, as shown in FIGS. 6 and 7, the user can look at the pyramid 31 and speak a command, such as "undo." The eye-tracking features of the AR-HMD device will detect that the user is looking at the pyramid 31 (where the user's gaze vector is represented by diminishing dashed lines 61 in FIG. 6), as opposed to the tall box 32a, for example, and will therefore apply the undo operation only to the pyramid 31. To enable the undo functionality generally, the AR-HMD device may store in memory a complete history of all user actions performed on objects with which the user can interact and other appropriate aspects of system state, for some predetermined time period up to and including the most recent user action (e.g., since the last power-on or reset of the AR-HMD device). To enable single-object undo, this history information is maintained on a per-object basis, i.e., separate history information for each holographic object with which the user can interact. The volume of stored history information may be limited only by the amount of memory available, or it may be further limited by user preference.

As shown in FIG. 7, for example, the default may be to undo the last user action performed on the selected target object. However, the user may also be given the option to view and select any arbitrary stored past state of the selected object, to which to revert the object's state. In some embodiments, this capability is implemented in conjunction with a visual "timeline" displayed to the user, as described further below.

Note that while the present description focuses on the ability to undo or revert a user action to a prior state, the techniques introduced here also provide, in similar manner, the ability to redo a user action that has already been undone.

Figure 18:
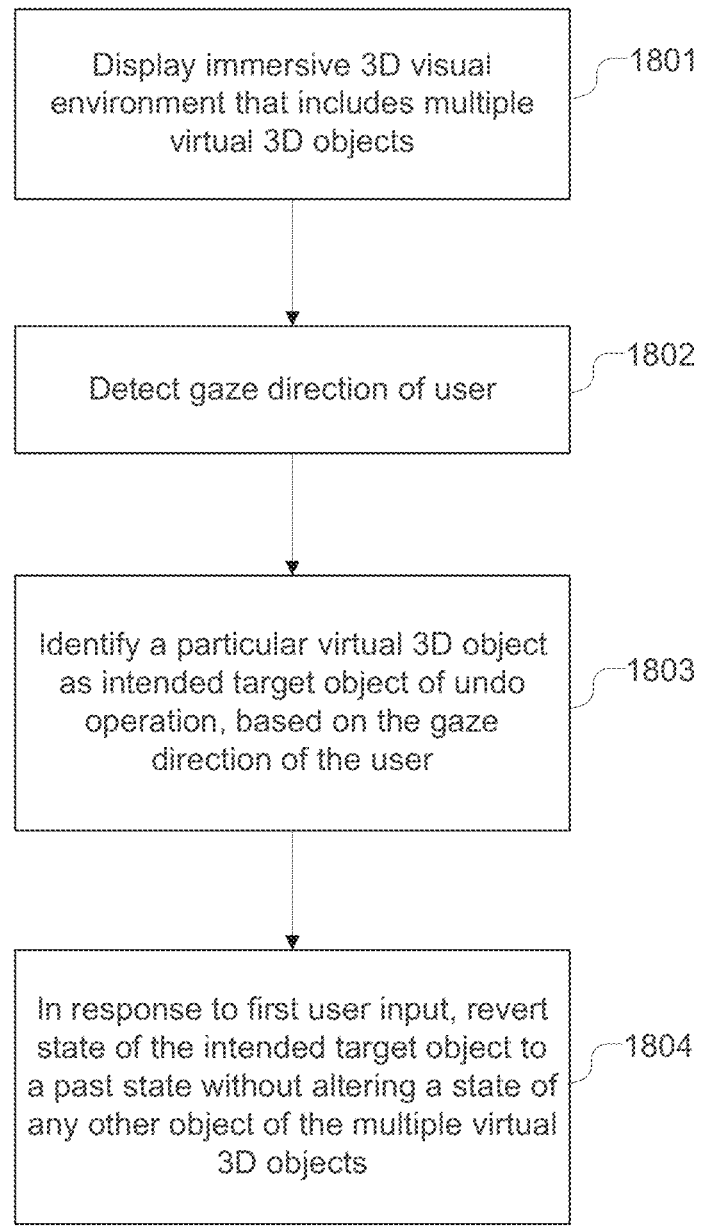
FIG. 18 is a flow diagram illustrating an example of a process to perform a single-object undo operation in a display system.

FIG. 18 is a flow diagram illustrating an example of a process that can be executed by a display system ("the system"), such as AR-HMD device 20 or another immersive 3D display system, to perform a single-object undo operation such as described above. Initially, at step 1801 the system displays an immersive 3D visual environment that includes multiple virtual (holographic) 3D objects. At step 1802 the system detects the gaze direction (vector) of user, for example, by using eye-tracking technology, face direction tracking technology (e.g., by head-tracking), or other suitable mechanism. At step 1803 the system identifies a particular virtual 3D object as the intended target object of a single-object undo operation, based on the gaze direction of the user. The gaze detection of step 1802 may be performed before or after receiving a user input to execute the undo function. In response to the user input, the system at step 1803 reverts the state of the intended target object to a past state without altering the state of any other object of the other displayed virtual 3D objects. Note that in various embodiments, the ordering of steps may be different from that described above and shown in FIG. 18. Additionally, in various embodiments, may include additional or fewer steps than those described above. For example, detection of the user's gaze (step 1802) may be performed continuously or repeatedly while the other steps are being performed.

In some embodiments, the display device may also enable the user to partially undo a single user action. For example, suppose the user continuously pushes or controls a holographic miniature car to make it travel along an arbitrary path (e.g., a path defined by the user in real-time) across the room. Then the user decides to back up the car precisely along that same path, but only partway, not all the way to the beginning of the path. The techniques introduced here provide the ability to do so, which for shorthand is referred to as "partial undo" capability.

To enable partial undo capability, the AR-HMD device records (either locally or in a remote data store to which it has access) at relatively high frequency all user actions and appropriate aspects of system state. It is assumed that a user action that can be partially undone in this manner is a single action that continuously spans a time period, starting from an initial time point ascertainable (measurable) by the display system and corresponding to the start of the user action, to a final time point ascertainable by the display system and corresponding to an end of the user action, where the time period includes at least one time point ascertainable by the display system between the initial time point and final time point. In other words, the display system can measure time at sufficiently small intervals that the single user action will span multiple time intervals, where the state of the visualization (including the target object) is recorded at multiple time intervals spanned by that user action.

Figure 8:
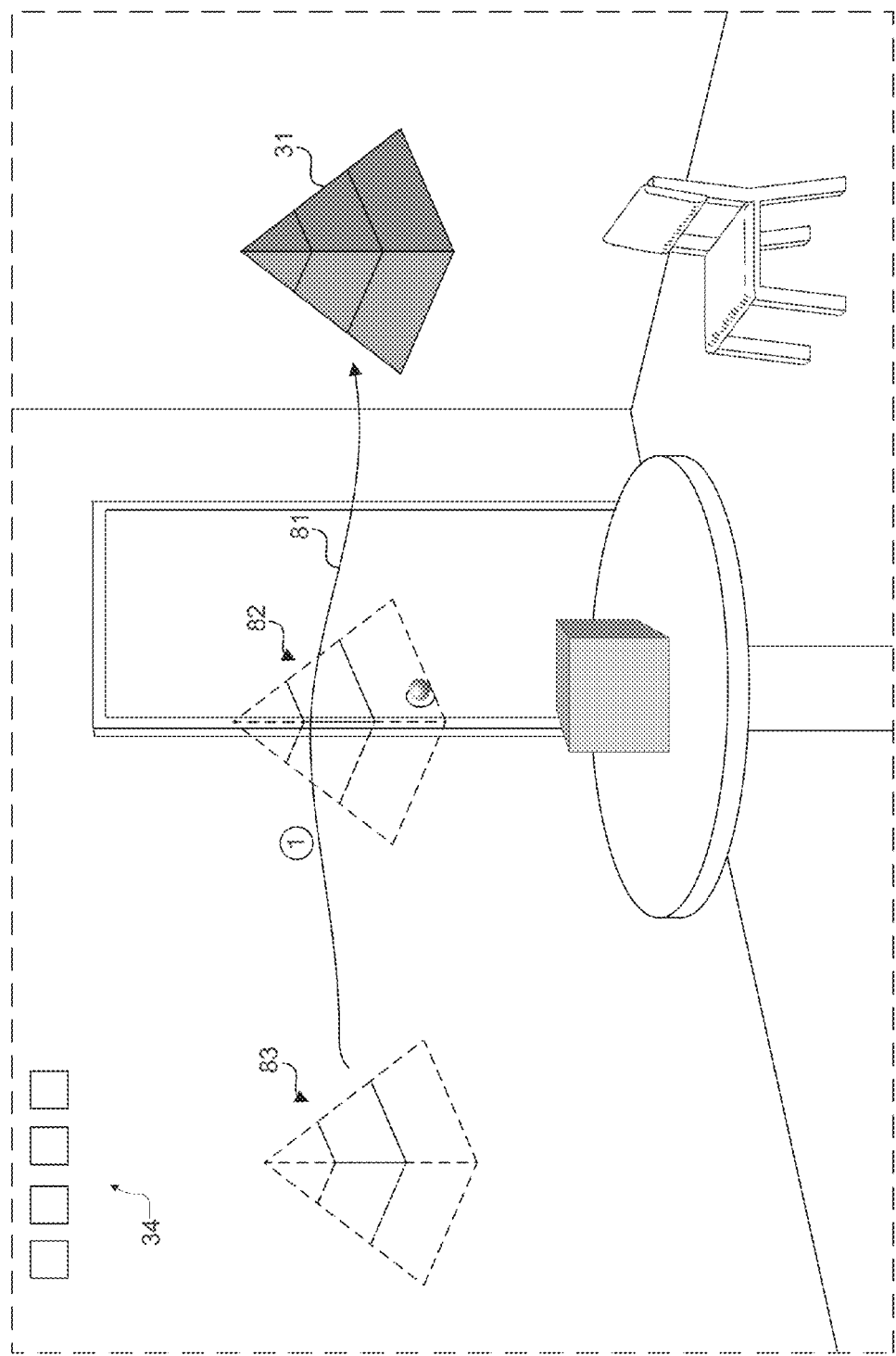
Figure 9:
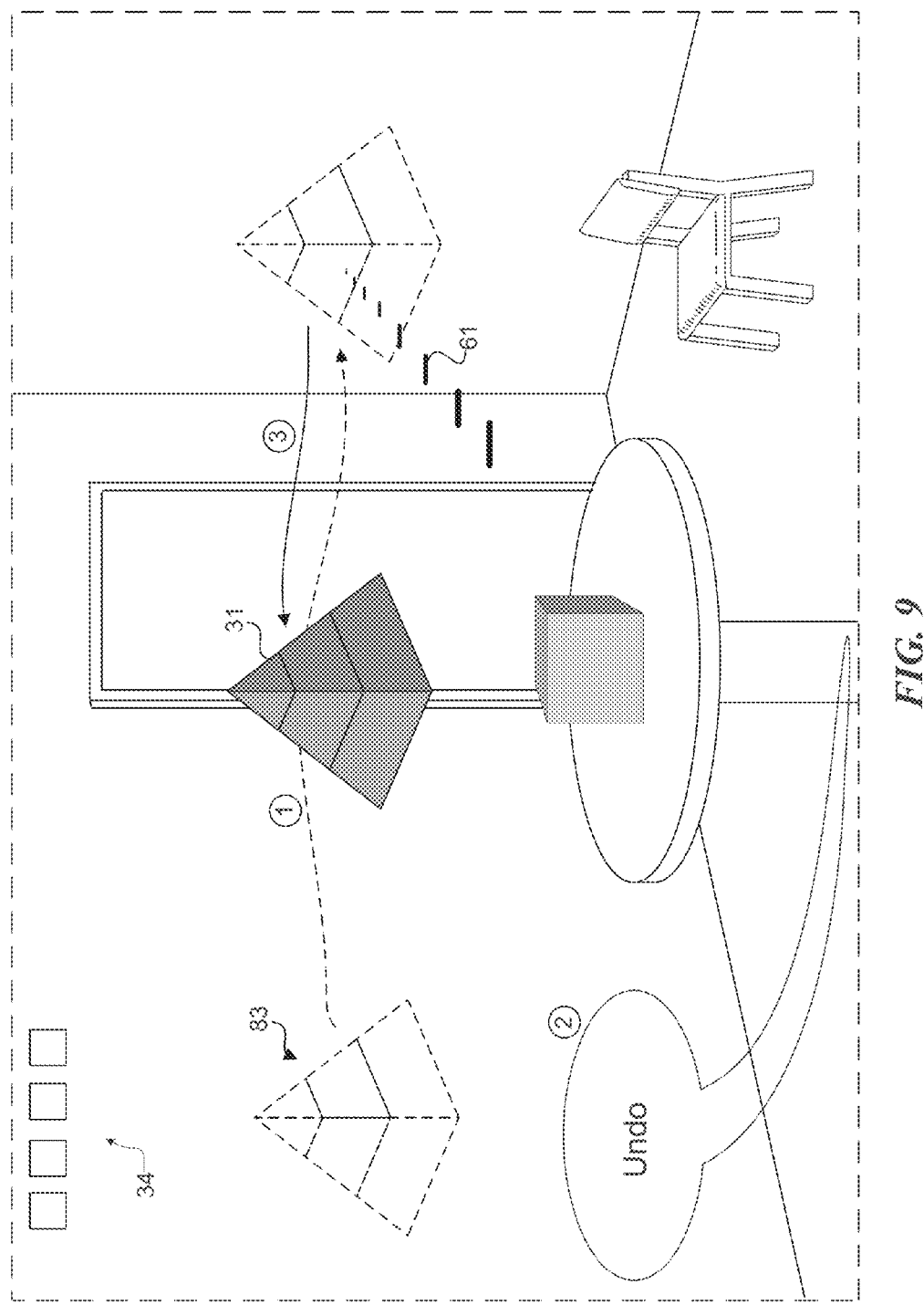
Figure 10:
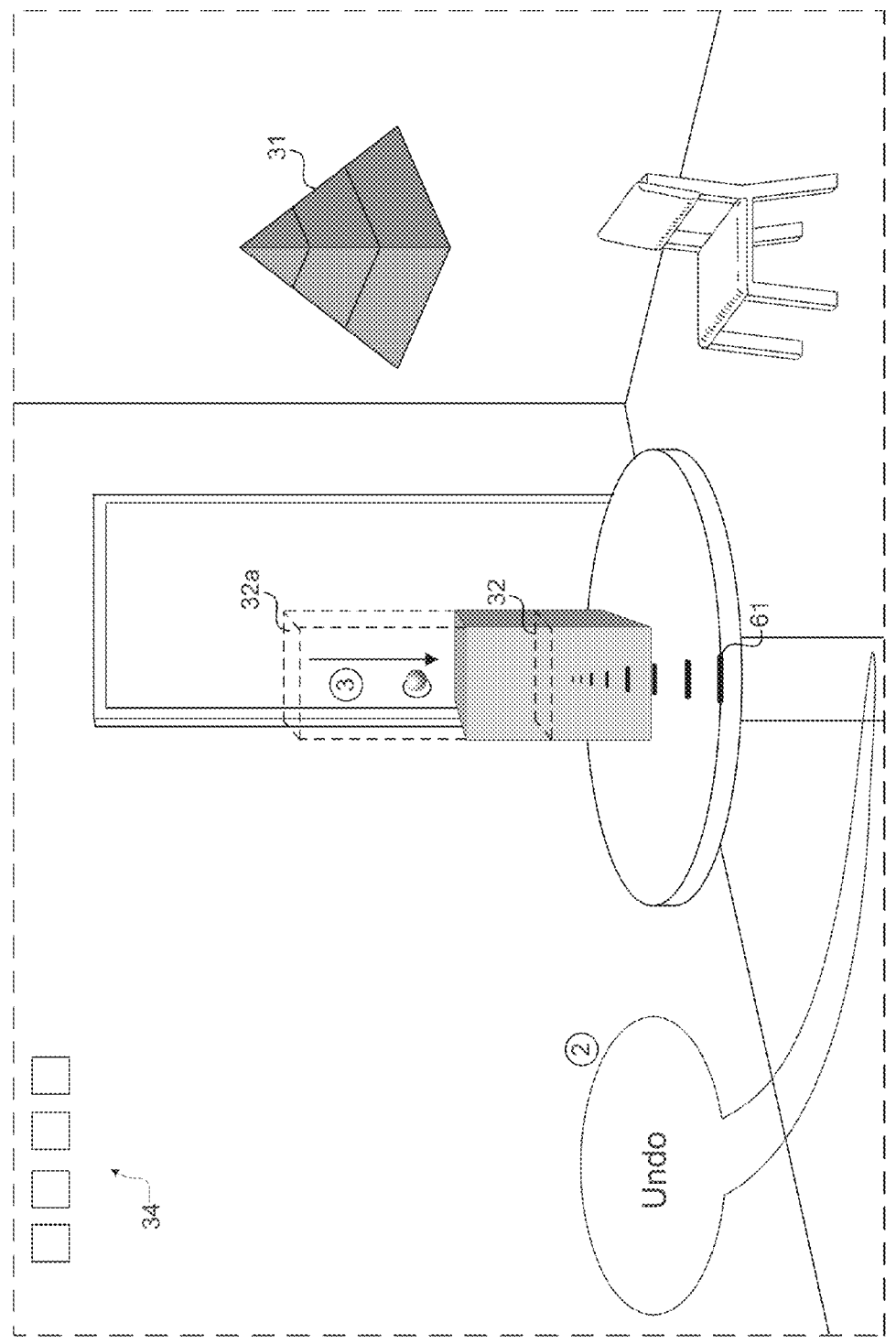

For an illustrated example of the partial undo functionality, refer to FIGS. 3 and 8. Suppose that the user moved the pyramid 31 from left to right along a given path 81 by using a single user action, such as a hand gesture representing a "drag" operation. At one time point during this action the pyramid 31 appeared to occupy an intermediate position 82 in space between its initial position 83 on the left and its final position on the right. Accordingly, the user may wish to undo the move only partially, for example, to place the pyramid 31 back at intermediate position 82, as shown in FIG. 9. Of course, the user could instead simply drag the pyramid 31 back toward the left; however, for purposes of this explanation it is assumed that the user prefers to partially undo the original move operation, for reasons that are not germane to this description (but for example, the user may wish to revert precisely along the original path through which the object was moved). Therefore, the user can partially undo the move operation as illustrated in FIG. 9. As in the previous examples, the target object of the undo operation (pyramid 31 in this example) can be selected simply by looking at it, perhaps in conjunction with another user input such as a spoken "undo" command or a hand movement. In another example illustrated in FIG. 10, the user can partially undo the operation that stretched the cube 32 into the tall box 32a (shown in FIG. 5), to make it a shorter box 32b (still taller than the cube 32).

Depending on implementation, any convenient manner of user input might be used to specify the extent to which the previous user action (e.g., the move) is to be undone, such as a voice command (e.g., "undo halfway") or a hand movement (e.g., pointing to the spot in space to which the object should be reverted), for example. As another example, the system may display a visual timeline showing multiple prior display states, any one of which can be selected for a partial undo or a complete undo, as discussed below with reference to FIGS. 11 through 18.

Figure 19:
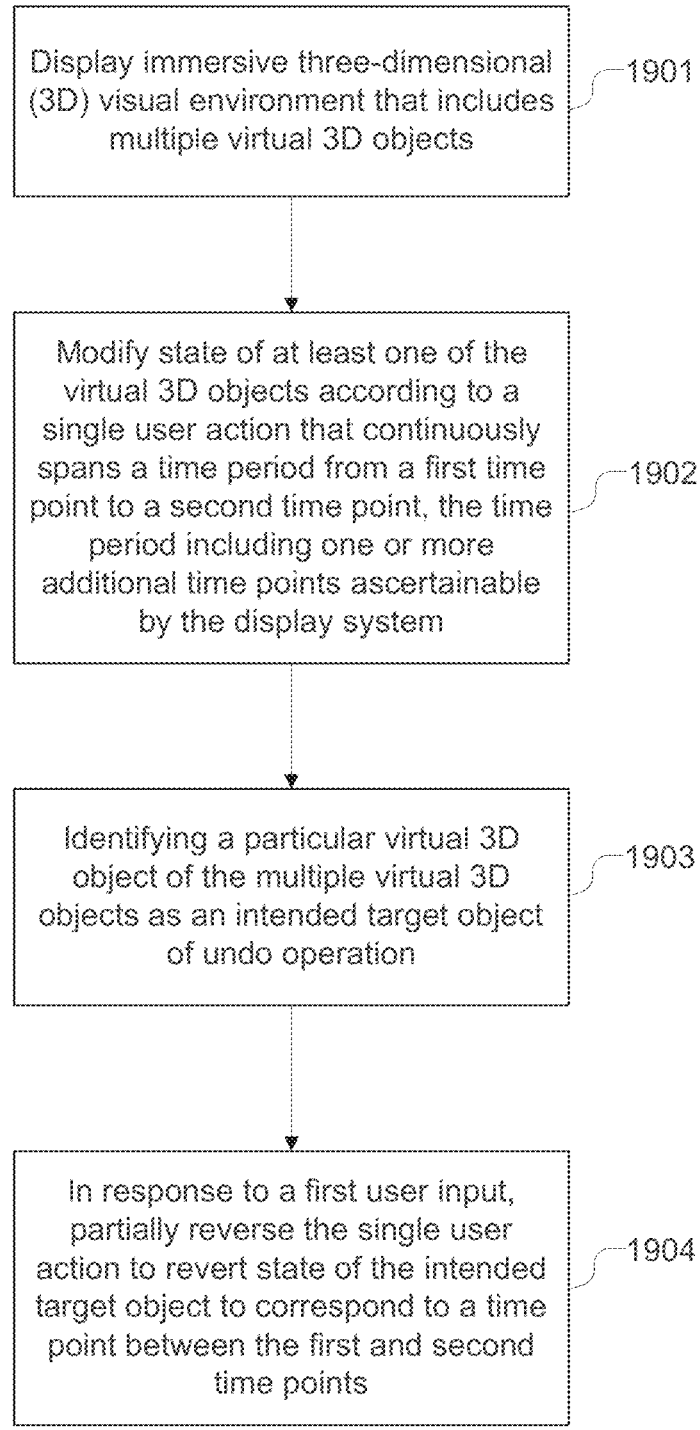
FIG. 19 is a flow diagram illustrating an example of a process to perform a partial undo operation in a display system.

FIG. 19 is a flow diagram illustrating an example of a process that can be executed by a display system ("the system"), such as AR-HMD device 20 or another immersive 3D display system, to perform a partial undo operation such as described above. Initially, at step 1901 the system displays an immersive 3D visual environment that includes multiple virtual (holographic) 3D objects. At step 1902 the system modifies the state of at least one of the virtual 3D objects according to a single user action that continuously spans a time period from a first time point to a second time point, where the time period includes one or more additional time points ascertainable by the display system. At step 1903 the system identifies a particular virtual 3D object of the multiple virtual 3D objects as the intended target object of an undo operation. As noted above, the intended target object may be identified based on the user's gaze or any other suitable input. In response to a first user input, the system at step 1904 partially reverses the single user action, to revert the state of the intended target object to correspond to a time point between the first and second time points. Note that in various embodiments, the ordering of steps may be different from that described above and shown in FIG. 19. Additionally, in various embodiments, may include additional or fewer steps than those described above.

Figure 11:
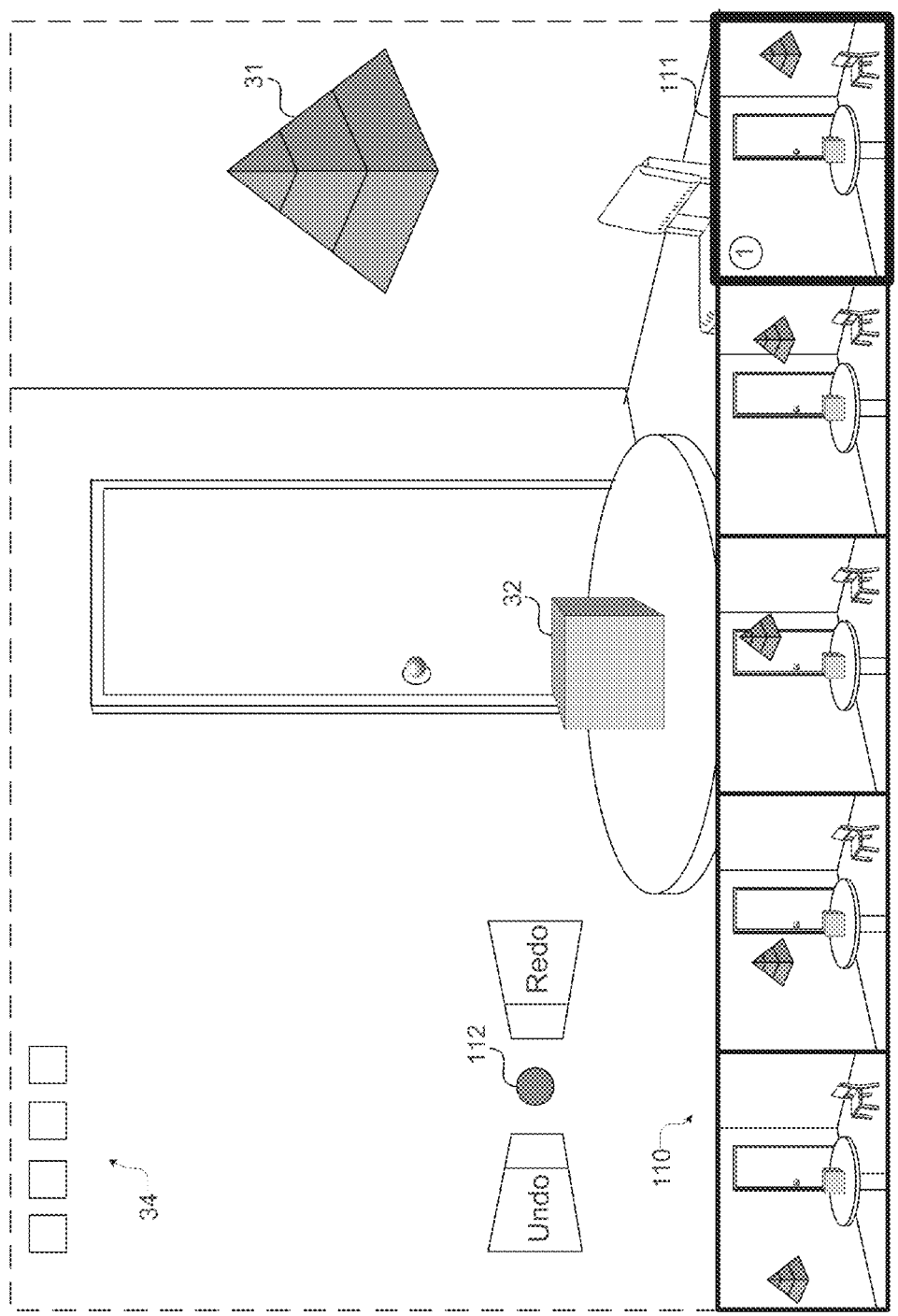

FIG. 11 shows a simple example of the timeline feature. In response to a predetermined user input, such as a spoken "timeline" or "undo" command or a predetermined hand movement, the system displays a series of thumbnail images 110, which may be displayed at a relatively low resolution, showing the state of the visualization at different past points in time. In the illustrated embodiment, the images are in chronological sequence from left to right, though any other arrangement can be used, which preferably indicates the chronological sequence of the images. By default, the most recent prior state may be selected, as indicated by a selection indicator 111, such as highlighting or thicker image border. The time spacing of the thumbnail images can be uniform or it can vary. For example, the thumbnail images may correspond to past states at fixed time intervals. Alternatively, the time points corresponding to the thumbnail images may be determined by the system according to the nature of the visual state changes in a given period of time. For example, if the system detects significant visual state changes within a given period of time, it may save state more frequently than if it detects fewer changes within that period of time; in the former case, therefore, the thumbnail images may be more "densely" packed in time than in the latter case.

Figure 12:
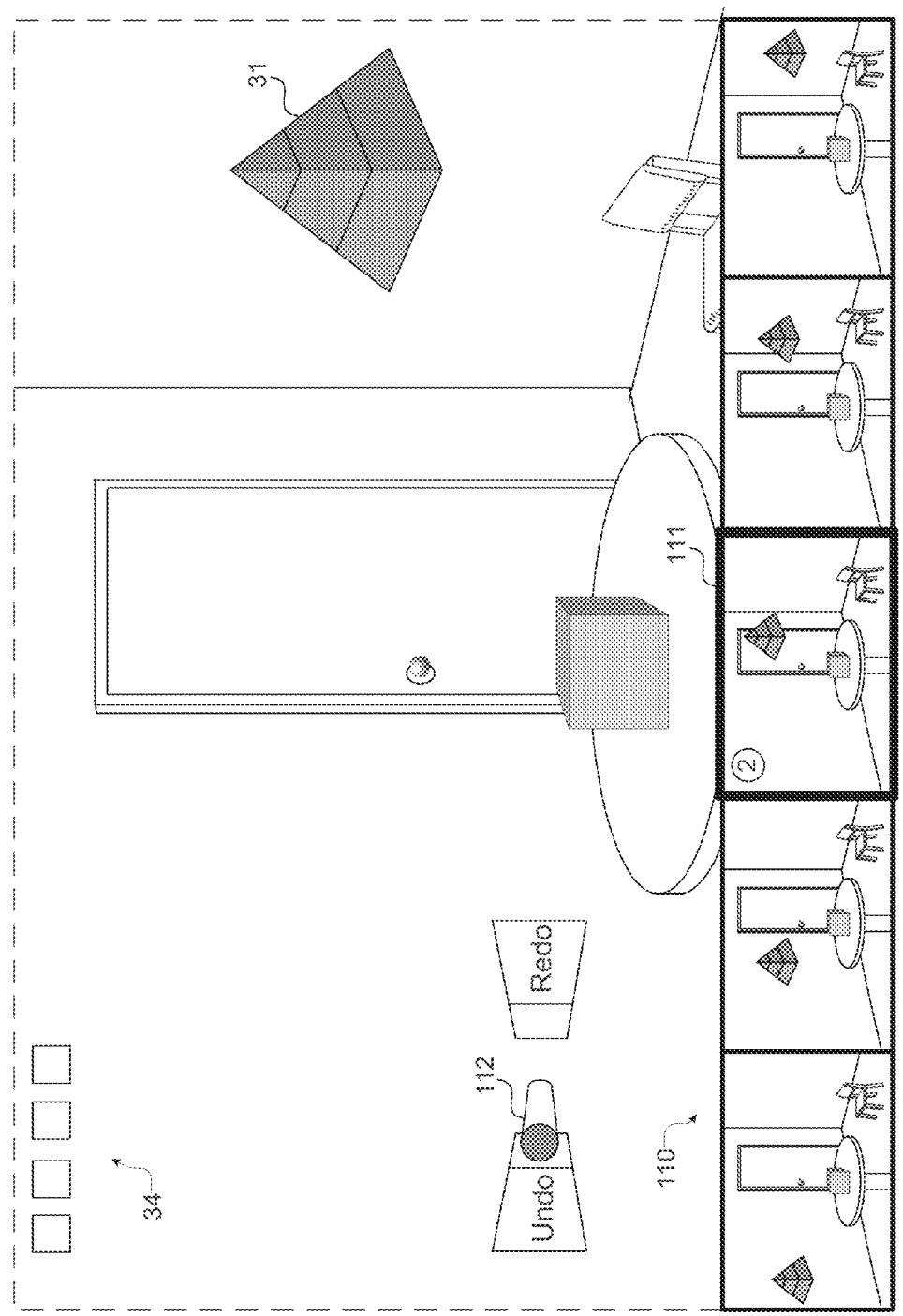
Figure 13:
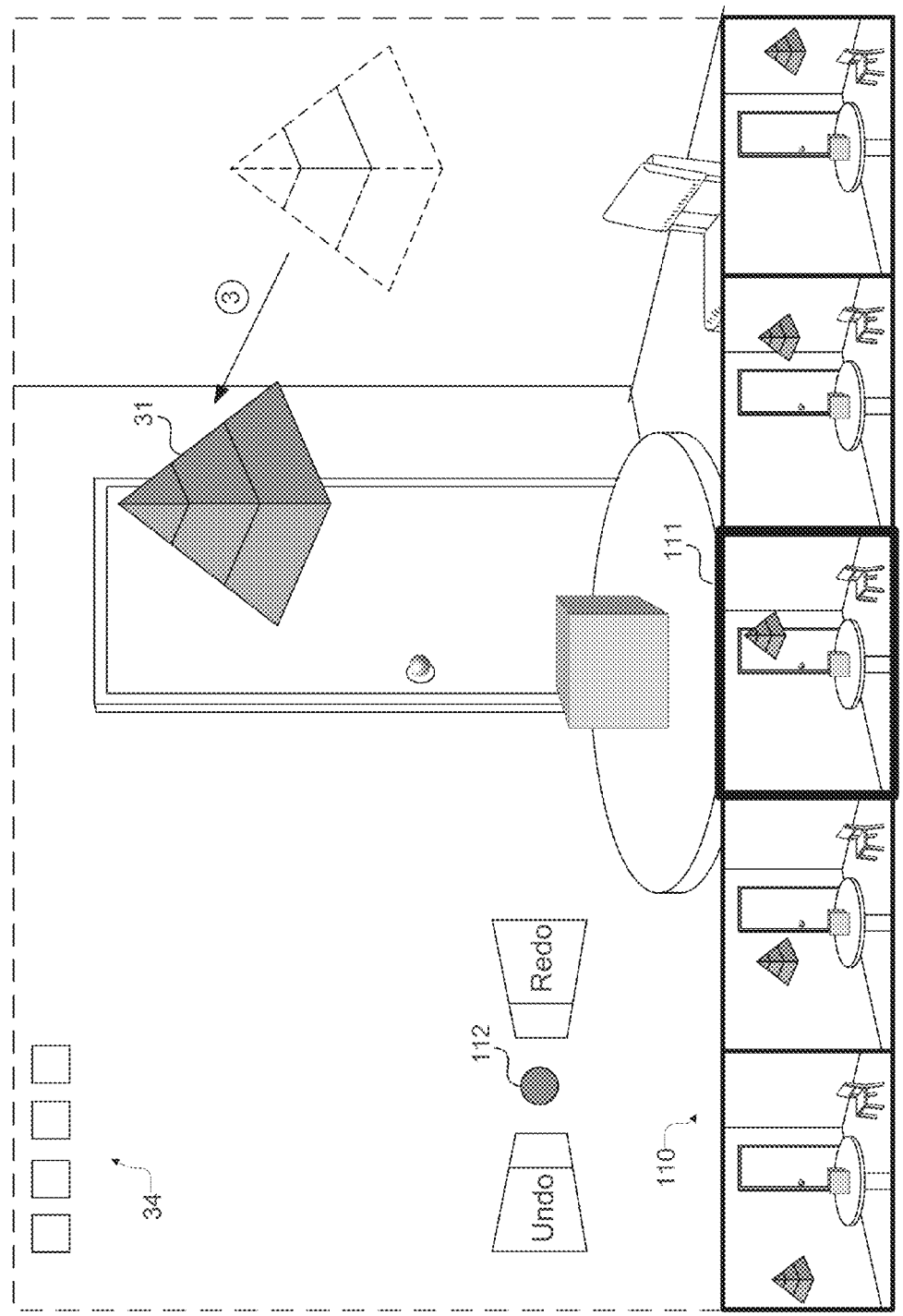

In the illustrated example, the display also includes a holographic joystick 112 that the user can manipulate to scroll through the thumbnail images. In other embodiments, a physical joystick or other physical or holographic control may be substituted for the holographic joystick 112. The user can use hand movements, for example, to move the joystick 112 left or right. To scroll the selection indicator 111 to the left (i.e., to view thumbnail images farther back in time), the user can move the joystick 112 to the left, as illustrated in FIG. 12. Similarly, to scroll the selection indicator 111 to the right (i.e., to view images closer to the present), the user can move the joystick 112 to the right. If the user continues to hold the joystick 112 to the left after the leftmost displayed thumbnail image is selected, the thumbnail images 111 themselves may then scroll to the right to allow the user to see display states prior to the earliest state initially displayed. The user may be allowed to zoom in on any given thumbnail image (by inputting a predetermined command) to view the corresponding past state at full resolution. To commit the undo operation to a particular past state, the user can, after selecting that state's thumbnail image, provide another predetermined input, such as saying "select" or "accept" or making another predetermined hand movement (e.g., lifting a depressed finger, similar to a PC mouse-based interaction of releasing a clicked button). As shown by example in FIG. 13, the user has committed the undo operation to the center of thumbnail image in FIGS. 11 and 12, as indicated by the fact that the pyramid 31 has moved from its position on the right back toward the center of the display.

In the above example, the thumbnail images 111 are arranged in the form of a linear visual "timeline." In other embodiments, a timeline of past states may have a different appearance. For example, a timeline of past states may be displayed in a circular or radial form, as shown in FIGS. 15 through 18.

Figure 14:
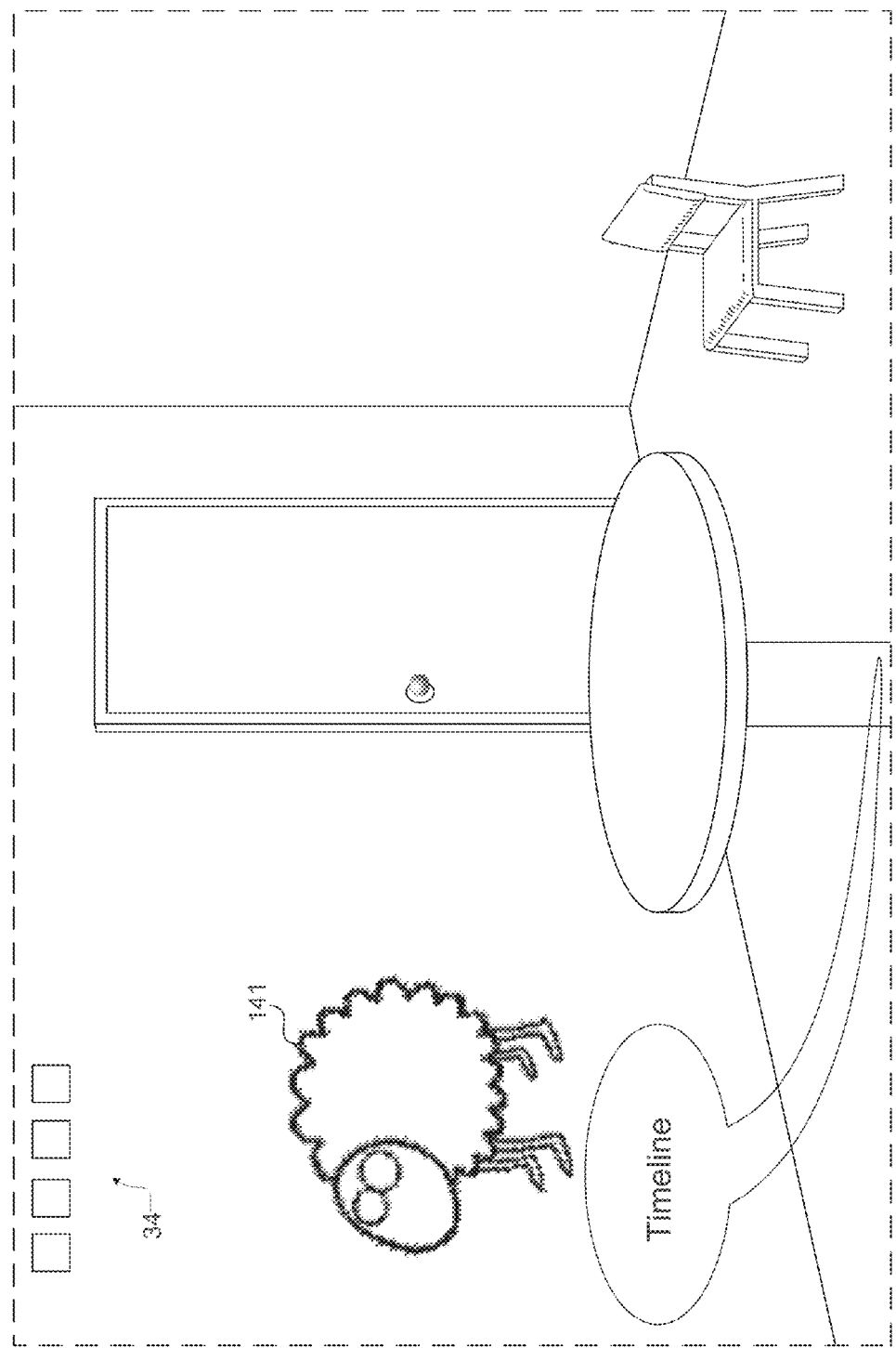

Referring to FIG. 14, suppose the user is drawing a sheep 141 floating in the 3D space in front of him. The user may be using a holographic drawing tool, such as a paint brush, spray paint can, pen, or the like, which is not germane to this description and therefore is not depicted. Also, in practice the user may be able to create much more complex objects, including 3D objects, but to simplify illustration the sheep 141 in FIGS. 14 through 18 is shown as two-dimensional.

Figure 15:
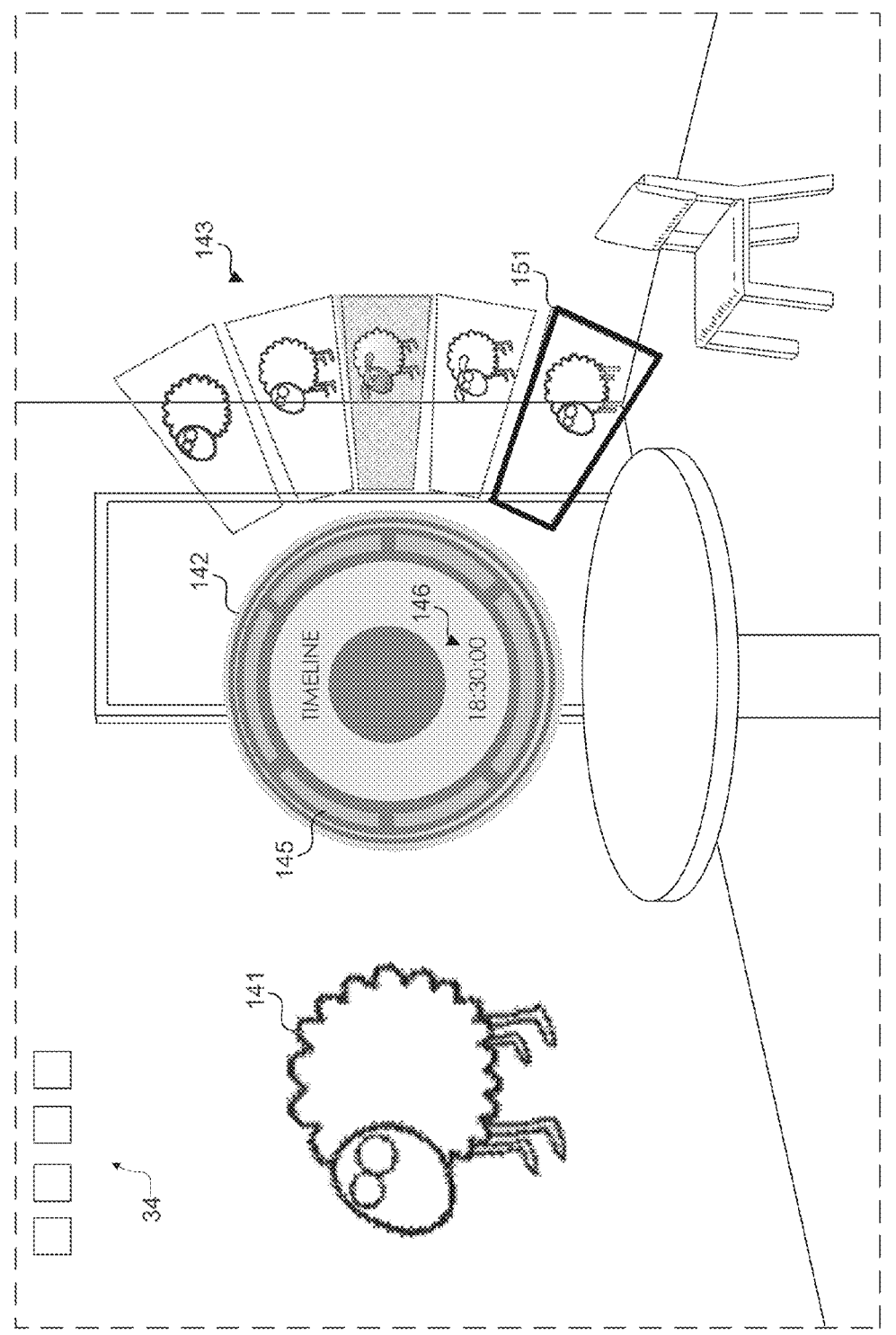

Suppose now that the user wishes to invoke the timeline feature to perform an undo operation. As in the previous example, the user may do so by an appropriate command, such as by saying "timeline" or "undo." In response, the system displays a holographic user control, such as a timeline dial 142 as shown in FIG. 15. Initially, the timeline dial includes the time indicator 146 the current time of day (e.g., as determined by the AR-HMD device's system clock), which in the illustrated example is 18:30:00. The system then populates a sequence of thumbnail images 143, representing past states of the display, around the timeline dial 142. The timeline dial 142 may include or be divided into a number of segments 145, each of representing a particular period of time. For example, the timeline dial in FIGS. 14 through 17 is divided into six equal 4-hour time segments 145, collectively representing a complete 24-hour period up to the time at which the "timeline" command was input. By default, the system may select the most current time segment 145 and may further highlight the most recent thumbnail image 143 with a selection indicator 151. The user can then select a different thumbnail image, or a different time segment representing an earlier time period, to view its thumbnail images.

Figure 16:
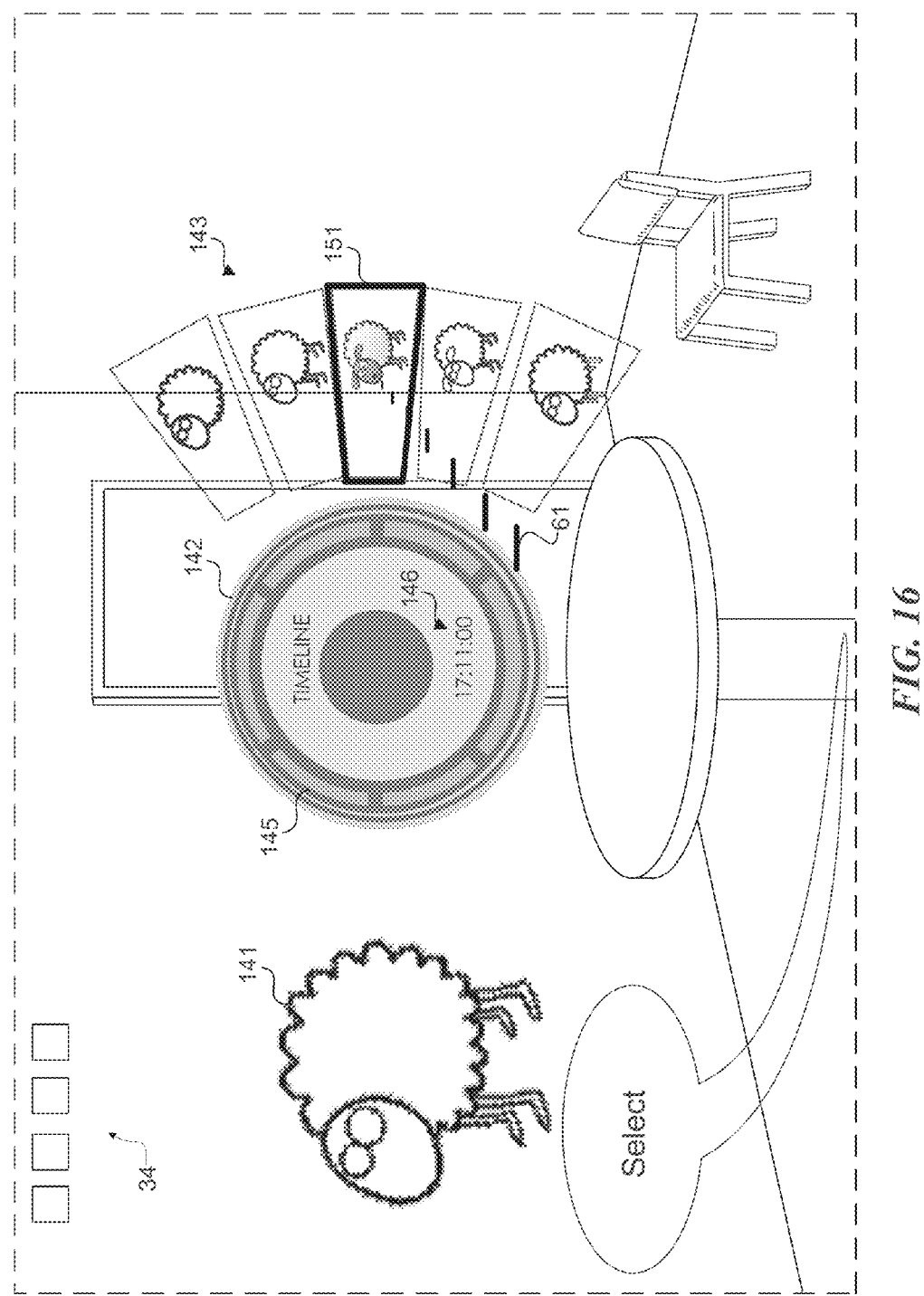
Figure 17:
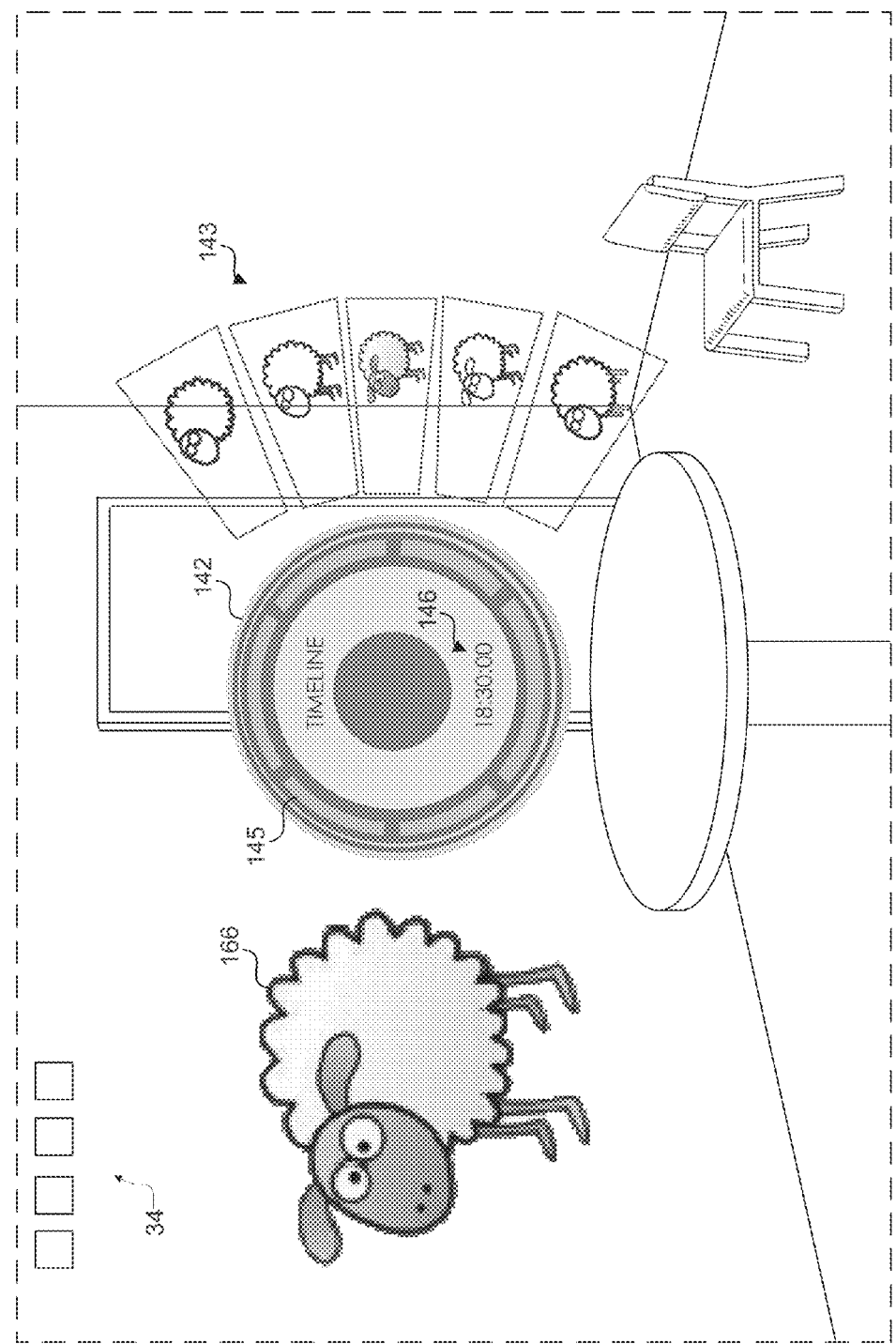

The user can move a selection indicator 151 through the different displayed thumbnail images 143, for example, by sequentially looking at different images (i.e., through eye tracking), by hand movement, by operating a physical control or holographic control (e.g. a holographic joystick such as shown in FIG. 11), or by any other suitable user input method. The time indicator 146 can change responsively to the currently selected thumbnail image to indicate the time at which the display was in that state. For example, as shown in FIG. 16, the user looks at or otherwise selects the middle thumbnail image to move the selection indicator to that image. The user then enters an appropriate command, such as saying "select" or a predetermined hand movement, to cause the system to revert to that display state, the result of which is shown by example in FIG. 17, where the sheep image 166 on the left has been automatically reverted to match the selected thumbnail image. Many different variations of these illustrate approaches are also possible.

Figure 20:
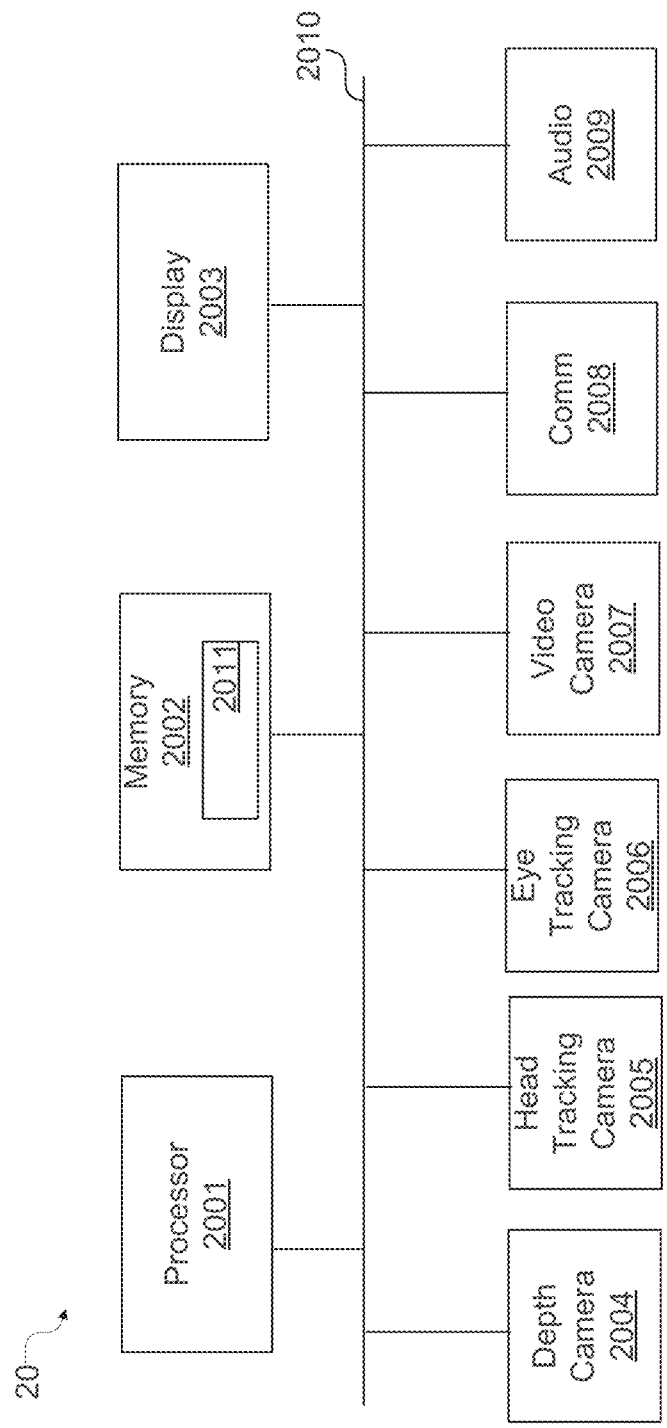
FIG. 20 is a block diagram showing an example of various functional components of an AR-HMD device.

FIG. 20 shows an example of various functional components of the AR-HMD device 20, according to some embodiments. In FIG. 20, the functional components of the AR-HMD device 20 includes one or more instance of each of the following: a main processor 2001, memory 2002, transparent display device 2003, depth camera 2004, head tracking cameras 2005, eye-tracking camera 2006, video camera 2007, communication device 2008, and audio subsystem 2009, all coupled together (directly or indirectly) by an interconnect 2010. The interconnect 2010 may be or include one or more conductive traces, buses, point-to-point connections, controllers, adapters, wireless links and/or other conventional connection devices and/or media, at least some of which may operate independently of each other.

The main processor(s) 2001 individually and/or collectively control the overall operation of the AR-HMD device 20 and perform various data processing functions. For example, the processor(s) 2001 may provide or at least support the undo-redo features described above, including the single-object gaze-based undo, partial undo, timeline, etc. Each processor 2001 can be or include, for example, one or more general-purpose programmable microprocessors, digital signal processors (DSPs), graphics processing unit (GPU), mobile application processors, microcontrollers, application specific integrated circuits (ASICs), programmable gate arrays (PGAs), or the like, or a combination of such devices.

Data and instructions (code) 2011 that configure the processor(s) 2001 to execute aspects of the technique introduced here can be stored in the one or more memories 2002. Each memory 2002 can be or include one or more physical storage devices, which may be in the form of random access memory (RAM), read-only memory (ROM) (which may be erasable and programmable), flash memory, miniature hard disk drive, conventional hard disk drive, or other suitable type of storage device, or a combination of such devices.

The depth camera(s) 2004 can apply time-of-flight principles, for example, to determine distances to nearby objects. The distance information acquired by the depth camera 2004 is used (e.g., by processor(s) 2001) to construct a 3D mesh model of the surfaces in the user's environment. The head tracking camera(s) 2205 enable the AR-HMD device 20 to continuously track the current location and orientation of the user's head by acquiring images of the user's real-world environment. At least some of the functionality associated with surface detection and head tracking may be performed by the processor(s) 2001.

The communication device(s) 2007 enable the AR-HMD device 20 to receive data and/or commands from, and send data and/or commands to an external processing system, such as a personal computer or game console, although in at least some embodiments the AR-HMD device 20 can operate as a standalone device. Each communication device 2008 can be or include, for example, a universal serial bus (USB) adapter, Wi-Fi transceiver, Bluetooth or Bluetooth Low Energy (BLE) transceiver, Ethernet adapter, cable modem, DSL modem, cellular transceiver (e.g., 3G, LTE/4G or 5G), baseband processor, or the like, or a combination thereof. The audio subsystem 2009 includes at least one speaker and audio processing circuitry to output sound effects to the user.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software to implement the techniques introduced here may be stored on a non-transitory machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Examples of Certain Embodiments

Certain embodiments of the technology introduced herein are summarized in the following numbered examples:

1. A method comprising: displaying, by a display system to a user, an immersive three-dimensional (3D) visual environment that includes a plurality of virtual 3D objects; detecting a gaze direction of the user; identifying a particular virtual 3D object of the plurality of virtual 3D objects as an intended target object of a revert operation for reverting object state, based on the gaze direction of the user; and in response to a first user input, reverting a state of the intended target object to a past state without altering a state of any other object of the plurality of virtual 3D objects.

2. The method of example 1, wherein the immersive 3D visual environment is an augmented reality environment in which the plurality of virtual 3D objects are superimposed over a real view of a physical environment of the user.

3. The method of example 1 or example 2, further comprising: prior to detecting the first user input, modifying a state of at least one of the plurality of virtual 3D objects according to a single user action that continuously spans a time period from a first time point to a second time point, the time period including at least one additional time point ascertainable by the display system between the first time point and the second time point; and in response to a second user input, partially reversing the single user action to revert a state of said at least one of the plurality of virtual 3D objects to correspond to a time point between the first time point and the second time point.

4. The method of any of examples 1 to 3, further comprising, prior to reverting the state of the intended target object to the past state, displaying, by the display system, a user interface feature for performing the revert operation.

5. The method of any of examples 1 to 4, wherein displaying the user interface feature comprises: displaying a plurality of summary images indicative of a plurality of past states of the particular virtual 3D object, in an arrangement indicative of a chronological sequence of the plurality of past states; and enabling the user to select any one of the summary images to trigger said revert operation; wherein the first input includes a selection by the user of one of the summary images.

6. The method of any of examples 1 to 5, wherein displaying the user interface feature comprises displaying a virtual joystick operable by the user to scroll chronologically forward or backward among the summary images.

7. The method of any of examples 1 to 6, wherein displaying the user interface feature comprises displaying a substantially circular chronology indicator, and displaying the plurality of summary images around the substantially circular chronology indicator.

8. The method of any of examples 1 to 7, wherein displaying the user interface feature comprises displaying a guide indicator that visually associates a particular one of the summary images with a displayed 3D virtual 3D object that was modified at a time to which said particular one of the summary images corresponds.

9. The method of any of examples 1 to 8, wherein the first user input comprises at least one of a gesture or speech of the user.

10. A head-mounted display (HMD) device for augmented reality visualization, comprising: a head fitting to enable the head-mounted display device to be worn on the head of a user; a display device coupled to the head fitting and disposed to be positioned in front of the eyes of the user when the HMD device is worn by the user, the display device being at least partially transparent; a plurality of input devices, including an eye tracking camera; and a processor coupled to the plurality of input devices and the display device and configured to cause the display device to display to the user an augmented reality environment that includes a plurality of virtual three-dimensional (3D) objects overlaid on a real-world view of a 3D physical space in which the user is located, modify states of the plurality of virtual 3D objects in response to user inputs from the user; display a user interface feature for performing a revert operation for reverting an object state to a past state; detect a gaze direction of the user by use of the eye tracking camera; detect a first user input directed to the user interface feature; identify a particular virtual 3D object of the plurality of virtual 3D objects as an intended target object of the revert operation based on the gaze direction of the user; and in response to the first user input, revert a state of the intended target object without altering a state of any other object of the plurality of virtual 3D objects.

11. The HMD device of example 10, wherein the processor is further configured to: prior to detecting the first user input, modify a state of at least one of the plurality of virtual 3D objects according to a single user action that continuously spans a time period from a first time point to a second time point, the time period including at least one additional time point ascertainable by the display system between the first time point and the second time point; and in response to a second user input, partially reverse the single user action to revert a state of said at least one of the plurality of virtual 3D objects to correspond to a time point between the first and second time points.

12. The HMD device of example 10 or example 11, wherein displaying the user interface feature comprises: displaying a plurality of summary images indicative of a plurality of past states of the particular virtual 3D object, in an arrangement indicative of a chronological sequence of the plurality of past states; and enabling the user to select any one of the summary images to trigger said revert operation; wherein the first input includes a selection by the user of one of the summary images.

13. A method comprising: displaying, by a display system to a user, an immersive three-dimensional (3D) visual environment that includes a plurality of virtual 3D objects; modifying, by the display system, a state of at least one of the plurality of virtual 3D objects according to a single user action that continuously spans a time period from a first time point to a second time point, the time period including at least one additional time point ascertainable by the display system between the first and second time points; identifying, by the display system, a particular virtual 3D object of the plurality of virtual 3D objects as an intended target object of a revert operation for reverting object state; and in response to a first user input, partially reversing the single user action to revert the state of the intended target object to correspond to a time point between the first and second time points.

14. The method of example 13, wherein reverting the state of the intended target object to correspond to a time point between the first and second time points is done without altering a state of any other object of the plurality of virtual 3D objects.

15. The method of example 13 or example 14, further comprising: detecting a gaze direction of the user, wherein identifying the particular virtual 3D object of the plurality of virtual 3D objects as the intended target object of the revert operation is based on the gaze direction of the user.

16. The method of any of examples 13 to 15, wherein the immersive 3D visual environment is an augmented reality environment in which the plurality of virtual 3D objects are superimposed over a real view of a physical environment of the user.

17. The method of any of examples 13 to 16, further comprising, prior to reverting the state of the intended target object to the past state, displaying, by the display system, a user interface feature for performing the revert operation, wherein displaying the user interface feature comprises: displaying a plurality of summary images indicative of a plurality of past states of the particular virtual 3D object, in an arrangement indicative of a chronological sequence of the plurality of past states; and enabling the user to select any one of the summary images to trigger said revert operation.

18. The method of any of examples 13 to 17, wherein displaying the user interface feature comprises displaying a virtual joystick operable by the user to scroll chronologically forward or backward among the summary images.

19. The method of any of examples 13 to 18, wherein displaying the user interface feature comprises displaying a substantially circular chronology indicator, and displaying the plurality of summary images around the substantially circular chronology indicator.

20. The method of any of examples 13 to 19, wherein the first user input comprises at least one of a gesture or speech of the user.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
    displaying, by a display system to a user, an immersive three-dimensional (3D) visual environment that includes a plurality of virtual 3D objects;
    modifying a state of a particular object of the plurality of virtual 3D objects according to a single user action that continuously spans a time period from a first time point to a second time point, the time period including at least one additional time point ascertainable by the display system between the first time point and the second time point;

detecting a gaze direction of the user;
identifying the particular object of the plurality of virtual 3D objects as an intended target object of a revert operation for reverting object state, based on the gaze direction of the user;
detecting a first user input; and
in response to the first user input, reverting the state of the particular object to a past state without altering a state of any other object of the plurality of virtual 3D objects, wherein the particular object is not the most recent object operated upon by the user, of the plurality of virtual 3D objects, and wherein said reverting includes partially reversing the single user action to revert a state of the particular object to correspond to a time point between the first time point and the second time point.

2. The method of claim 1, wherein the immersive 3D visual environment is a n augmented reality environment in which the plurality of virtual 3D objects are superimposed over a real view of a physical environment of the user.

3. The method of claim 1, further comprising, prior to reverting the state of the particular object to the past state, displaying, by the display system, a user interface feature for performing the revert operation.

4. The method of claim 3, wherein displaying the user interface feature comprises:
displaying a plurality of summary images indicative of a plurality of past states of the particular object, in an arrangement indicative of a chronological sequence of the plurality of past states; and
enabling the user to select any one of the summary images to trigger said revert operation;
wherein the first input includes a selection by the user of one of the summary images.

5. The method of claim 4, wherein displaying the user interface feature comprises displaying a virtual joystick operable by the user to scroll chronologically forward or backward among the summary images.

6. The method of claim 4, wherein displaying the user interface feature comprises displaying a substantially circular chronology indicator, and displaying the plurality of summary images around the substantially circular chronology indicator.

7. The method of claim 6, further comprising:
receiving a second user input from the user, the second user input being directed to the user interface feature and indicating a user selection of a second time period; and
in response to the second user input, replacing the plurality of summary images in the user interface feature with a second plurality of summary images indicative of a corresponding second plurality of past states of the particular object corresponding to the second time period.

8. The method of claim 4, wherein displaying the user interface feature comprises displaying a guide indicator that visually associates a particular one of the summary images with a displayed 3D virtual 3D object that was modified at a time to which said particular one of the summary images corresponds.

9. The method of claim 1, wherein the first user input comprises at least one of a gesture or speech of the user.

10. A head-mounted display (HMD) device for augmented reality visualization, comprising:
a head fitting to enable the head-mounted display device to be worn on the head of a user;
a display device coupled to the head fitting and disposed to be positioned in front of the eyes of the user when the HMD device is worn by the user, the display device being at least partially transparent;
a plurality of input devices, including an eye tracking camera; and
a processor coupled to the plurality of input devices and the display device and configured to
cause the display device to display to the user an augmented reality environment that includes a plurality of virtual three-dimensional (3D) objects overlaid on a real-world view of a 3D physical space in which the user is located,
modify states of the plurality of virtual 3D objects in response to user inputs from the user, including modifying a state of a particular object of the plurality of virtual 3D objects according to a single user action that continuously spans a time period from a first time point to a second time point, the time period including at least one additional time point ascertainable by the display system between the first time point and the second time point;
display a user interface feature for performing a revert operation for reverting an object state to a past state;
detect a gaze direction of the user by use of the eye tracking camera;
detect a first user input directed to the user interface feature;
identify the particular object of the plurality of virtual 3D objects as an intended target object of the revert operation based on the gaze direction of the user; and
in response to the first user input, revert a state of the particular object without altering a state of any other object of the plurality of virtual 3D objects, wherein the particular object is not the most recent object operated upon by the user, of the plurality of virtual 3D objects, and wherein reverting the state of the particular object includes partially reversing the single user action to revert a state of the particular object to correspond to a time point between the first time point and the second time point.

11. The HMD device of claim 10, wherein displaying the user interface feature comprises:
displaying a plurality of summary images indicative of a plurality of past states of the particular virtual 3D object, in an arrangement indicative of a chronological sequence of the plurality of past states; and
enabling the user to select any one of the summary images to trigger said revert operation;
wherein the first input includes a selection by the user of one of the summary images.

12. A method comprising:
displaying, by a display system to a user, an immersive three-dimensional (3D) visual environment that includes a plurality of virtual 3D objects;
modifying, by the display system, a state of at a particular object of the plurality of virtual 3D objects according to a single user action that continuously spans a time period from a first time point to a second time point, the time period including at least one additional time point ascertainable by the display system between the first and second time points;
identifying, by the display system, the particular object of the plurality of virtual 3D objects as an intended target object of a revert operation for reverting object state; and
in response to a first user input, partially reversing the single user action to revert the state of the particular object to correspond to a time point between the first and second time points, wherein the particular object is not the most recent object operated upon by the user, of the plurality of virtual 3D objects.

13. The method of claim 12, wherein reverting the state of the particular object to correspond to a time point between the first and second time points is done without altering a state of any other object of the plurality of virtual 3D objects.

14. The method of claim 12, further comprising:
detecting a gaze direction of the user, wherein identifying the particular virtual 3D object of the plurality of virtual 3D objects as the intended target object of the revert operation is based on the gaze direction of the user.

15. The method of claim 12, wherein the immersive 3D visual environment is an augmented reality environment in which the plurality of virtual 3D objects are superimposed over a real view of a physical environment of the user.

16. The method of claim 12, further comprising, prior to reverting the state of the particular object to the past state, displaying, by the display system, a user interface feature for performing the revert operation, wherein displaying the user interface feature comprises:
displaying a plurality of summary images indicative of a plurality of past states of the particular virtual 3D object, in an arrangement indicative of a chronological sequence of the plurality of past states; and
enabling the user to select any one of the summary images to trigger said revert operation.

17. The method of claim 16, wherein displaying the user interface feature comprises displaying a virtual joystick operable by the user to scroll chronologically forward or backward among the summary images.

18. The method of claim 16, wherein displaying the user interface feature comprises displaying a substantially circular chronology indicator, and displaying the plurality of summary images around the substantially circular chronology indicator.

19. The method of claim 12, wherein the first user input comprises at least one of a gesture or speech of the user.

20. A method comprising:
displaying, by a display system to a user, an immersive three-dimensional (3D) visual environment that includes a plurality of virtual 3D objects;
detecting a gaze direction of the user;
identifying a particular object of the plurality of virtual 3D objects as an intended target object of a revert operation for reverting object state, based on the gaze direction of the user;
displaying to the user a user interface feature for performing the revert operation, the user interface feature including a first plurality of summary images indicative of a corresponding first plurality of past states of the particular object for a first time period, wherein the first plurality of summary images are displayed around a substantially circular chronology indicator in an arrangement indicative of a chronological sequence of the plurality of past states;
detecting a first user input from the user, the first user input specifying a selection of one of the first plurality of summary images; and
in response to the first user input, reverting the state of the particular object to a past state corresponding to the selected summary image, without altering a state of any other object of the plurality of virtual 3D objects.

21. The method of claim 20, further comprising:
receiving a second user input from the user, the second user input being directed to the user interface feature and indicating a user selection of a second time period; and
in response to the second user input, replacing the first plurality of summary images in the user interface feature with a second plurality of summary images indicative of a corresponding second plurality of past states of the particular object corresponding to the second time period.

* * * * *